(12) United States Patent
Shimizu et al.

(10) Patent No.: US 12,282,741 B2
(45) Date of Patent: Apr. 22, 2025

(54) INFORMATION PROCESSING SYSTEM AND INFORMATION PROCESSING METHOD TO CONTROL BEHAVIOR OF AN AGENT

(71) Applicant: SONY GROUP CORPORATION, Tokyo (JP)

(72) Inventors: Itaru Shimizu, Tokyo (JP); Shouichi Doi, Tokyo (JP); Tomoko Kouno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 194 days.

(21) Appl. No.: 17/601,866

(22) PCT Filed: Apr. 7, 2020

(86) PCT No.: PCT/JP2020/015626
§ 371 (c)(1),
(2) Date: Oct. 6, 2021

(87) PCT Pub. No.: WO2020/213468
PCT Pub. Date: Oct. 22, 2020

(65) Prior Publication Data
US 2022/0164544 A1    May 26, 2022

(30) Foreign Application Priority Data
Apr. 16, 2019 (JP) .................. 2019-078088

(51) Int. Cl.
*G06F 40/35* (2020.01)
(52) U.S. Cl.
CPC .................. *G06F 40/35* (2020.01)

(58) Field of Classification Search
CPC ...................................................... G06F 40/35
See application file for complete search history.

(56) References Cited

U.S. PATENT DOCUMENTS

| 2017/0206095 | A1* | 7/2017 | Gibbs ............... G06F 3/167 |
| 2018/0349447 | A1* | 12/2018 | Maccartney ...... G06F 16/24578 |
| 2019/0050708 | A1 | 2/2019 | Miyajima |
| 2019/0122092 | A1* | 4/2019 | Haines ............ G06T 11/001 |

FOREIGN PATENT DOCUMENTS

| CN | 108885768 A | 11/2018 |
| CN | 108886532 A | 11/2018 |
| EP | 3435323 A1 | 1/2019 |
| JP | 2001-056225 A | 2/2001 |
| JP | 2005-326670 A | 11/2005 |
| KR | 10-2018-0123037 A | 11/2018 |
| WO | 2017/163515 A1 | 9/2017 |
| WO | 2017/191696 A1 | 11/2017 |

OTHER PUBLICATIONS

International Search Report and Written Opinion of PCT Application No. PCT/JP2020/015626, issued on Jul. 14, 2020, 09 pages of ISRWO.

* cited by examiner

*Primary Examiner* — Pierre Louis Desir
*Assistant Examiner* — Daniel W Chung
(74) *Attorney, Agent, or Firm* — CHIP LAW GROUP

(57) ABSTRACT

Provided is an information processing system that includes a user information storage unit that stores user information related to a user, a personality information storage unit that stores personality information defining a personality unique to an agent, and a control unit that controls an externalized behavior which is a behavior externalized by the agent, based on the personality information.

18 Claims, 12 Drawing Sheets

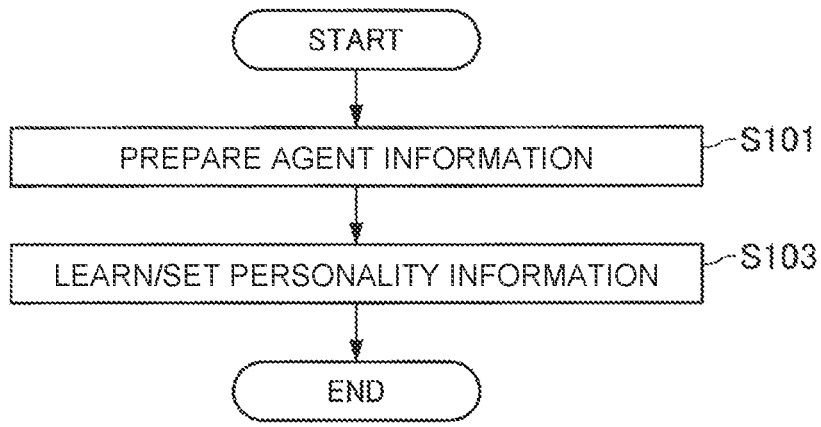
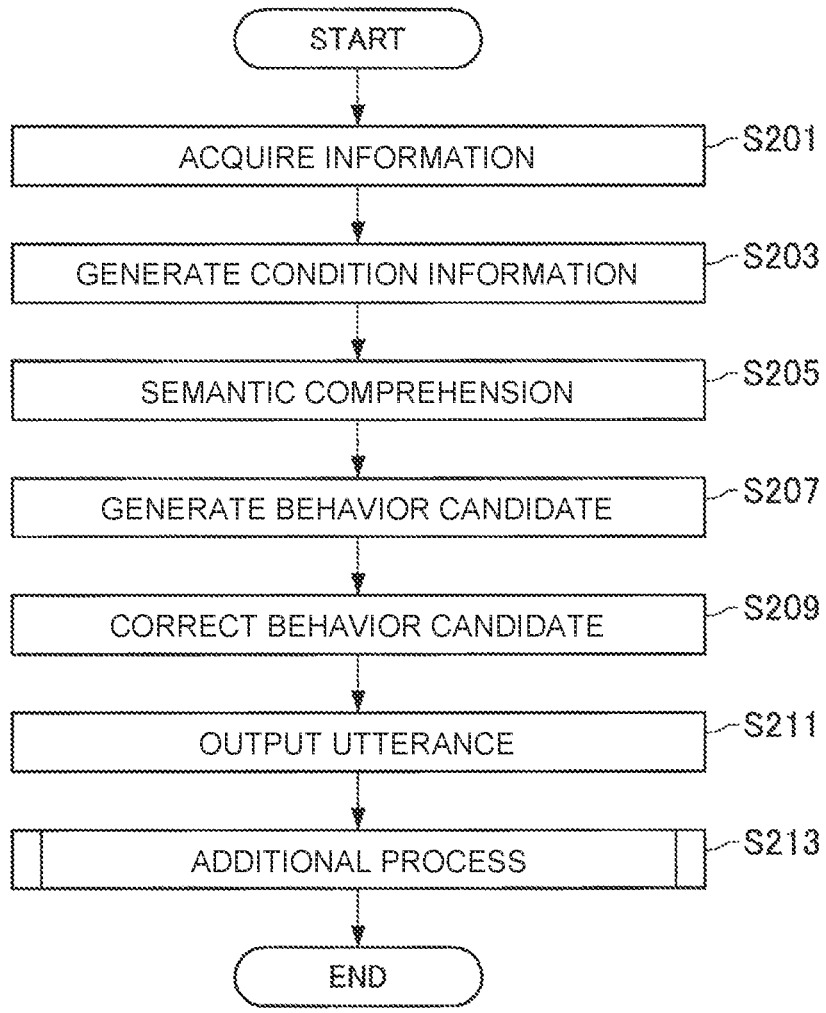

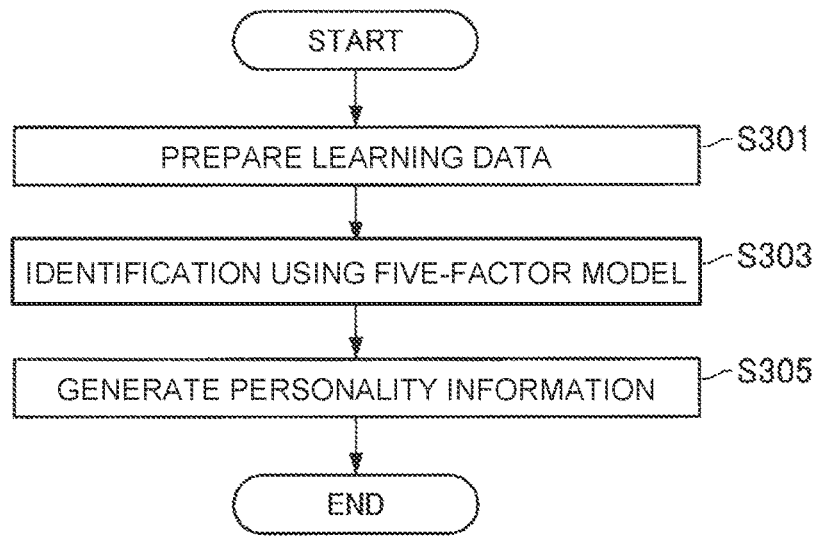
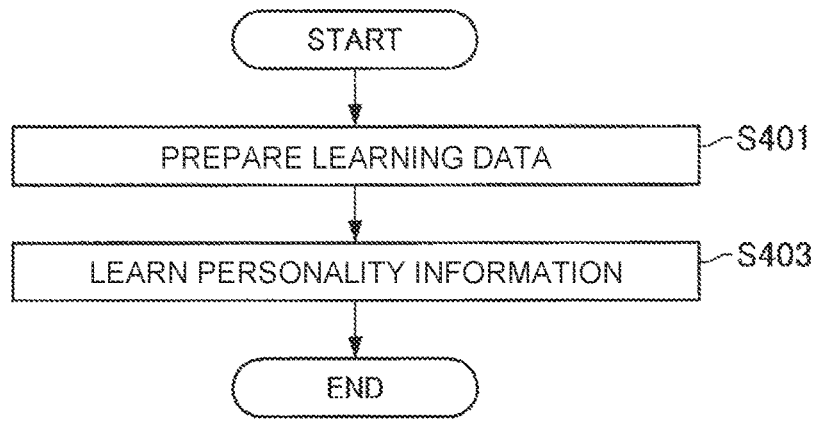
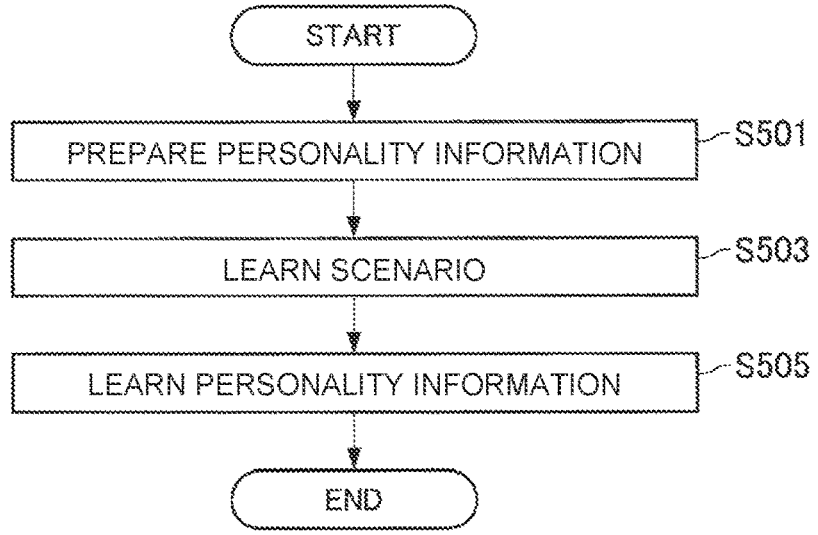

INFORMATION PROCESSING SYSTEM AND INFORMATION PROCESSING METHOD TO CONTROL BEHAVIOR OF AN AGENT

CROSS REFERENCE TO RELATED APPLICATIONS

This application is a U.S. National Phase of International Patent Application No. PCT/JP2020/015626 filed on Apr. 7, 2020, which claims priority benefit of Japanese Patent Application No. JP 2019-078088 filed in the Japan Patent Office on Apr. 16, 2019. Each of the above-referenced applications is hereby incorporated herein by reference in its entirety.

FIELD

The present disclosure relates to an information processing system, an information processing method, and a program.

BACKGROUND

In recent years, there have been popular services that can give enjoyment of utterance or the like using an agent imitating a specific character by using an information processing terminal such as a personal computer, a smartphone, or a tablet terminal. An original character of this agent has a specific personality in typical cases. Therefore, the agent is desired to behave in accordance with the personality.

For example, Patent Literature 1 discloses a technique of updating a possibility that an agent gives an utterance indicated by utterance sentence data in accordance with user's feedback to the utterance sentence data of the agent.

CITATION LIST

Patent Literature

Patent Literature 1: WO 2017/191696 A

SUMMARY

Technical Problem

The technique described in Patent Literature 1 requires feedback from the user who has recognized the utterance of the agent. For this reason, it has not been possible to perform realtime control of a behavior such as utterance externalized by the agent (hereinafter, a behavior externalized by the agent is referred to as an "externalized behavior"). Therefore, there has been a demand for a technology capable of controlling an externalized behavior of an agent such as an utterance by the agent before the externalized behavior is supplied to the user.

In view of this circumstance, the present disclosure proposes a novel and improved information processing system, information processing method, and program capable of controlling an externalized behavior of an agent before the externalized behavior is supplied to the user.

Solution to Problem

According to the present disclosure, an information processing system is provided that includes: a user information storage unit that stores user information related to a user; a personality information storage unit that stores personality information defining a personality unique to an agent; and a control unit that controls an externalized behavior which is a behavior externalized by the agent, based on the personality information.

Moreover, according to the present disclosure, an information processing method is provided that includes: storing, by memory, user information related to a user, storing, by the memory, personality information defining a personality unique to an agent; and controlling, by a processor, an externalized behavior, which is a behavior externalized by the agent, based on the personality information.

Moreover, according to the present disclosure, a program is provided that causes a computer to function as an information processing device that includes: a user information storage unit that stores user information related to a user; a personality information storage unit that stores personality information defining a personality unique to an agent; and a control unit that controls an externalized behavior which is a behavior externalized by the agent, based on the personality information.

BRIEF DESCRIPTION OF DRAWINGS

FIG. 3 is a flowchart illustrating an example of a method of generating personality information of an agent.

FIG. 4 is a flowchart illustrating an example of processes performed by the information processing device 10 according to an embodiment of the present disclosure.

FIG. 7 is a flowchart illustrating a first method of generating personality information.

FIG. 8 is a flowchart illustrating a second method of generating personality information.

FIG. 9 is a flowchart illustrating a third method of generating personality information.

DESCRIPTION OF EMBODIMENTS

Figure 1:
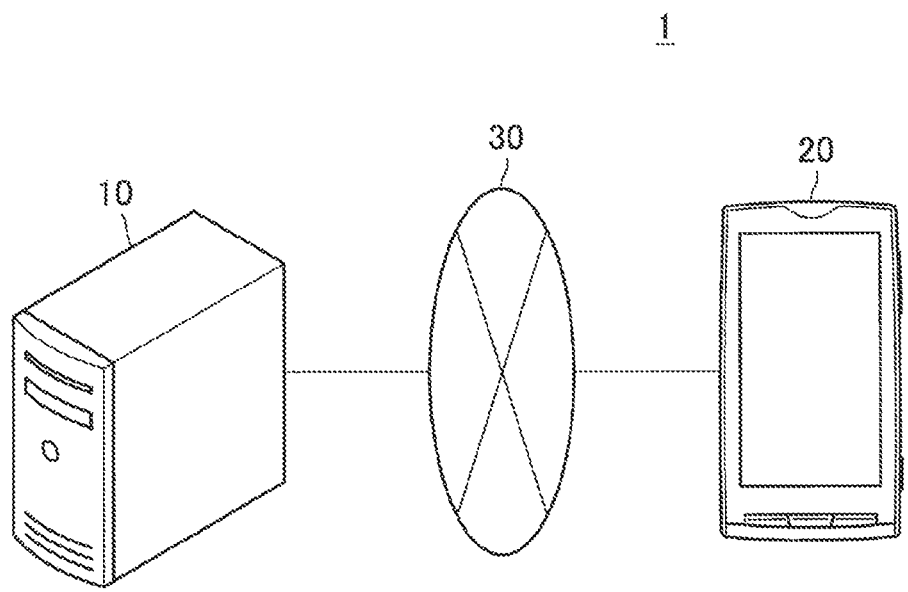
FIG. 1 is a diagram illustrating a configuration of an information processing system 1 according to an embodiment of the present disclosure.

A preferred embodiment of the present disclosure will be described in detail hereinbelow with reference to the accompanying drawings. Note that redundant descriptions will be omitted from the present specification and the drawings by assigning the same reference signs to components having substantially the same functional configuration.

Note that the description will be provided in the following order.

1. Outline of embodiments
1.1. Configuration of information processing system
1.2. Generation of personality information
1.3. Processing example
1.4. Effects
2. Variations in examples of generating personality information
3. Application examples
3.1. First application example (update of personality information)
3.2. Second application example (advertising management)
3.3. Third application example (service according to location/event)
3.4. Fourth application example (service according to situation)
3.5. Fifth application example (supervising script)
3.6. Other application examples
4. Hardware configuration
5. Supplementary notes

1. Outline of Embodiments

First, an outline of an embodiment of the present disclosure will be described with reference to FIGS. 1 to 4.

1.1. Configuration of Information Processing System

First, an example of a configuration of an information processing system 1 according to an embodiment of the present disclosure will be described with reference to FIG. 1. FIG. 1 is a diagram illustrating a configuration of the information processing system 1 according to an embodiment of the present disclosure. As illustrated in FIG. 1, the information processing system 1 includes an information processing device 10 and a user terminal 20. The information processing device 10 and the user terminal 20 are connected to each other via a variety of networks 30. Note that the information processing device 10 and the user terminal 20 may be connected to each other by wireless or wired connection.

The information processing device 10 is a device that outputs, to the user terminal 20 connected via the network 30, information related to various externalized behavior performed by an agent on which a predetermined personality is defined. The configuration of the information processing device 10 and the processes to be performed will be described in detail below.

The user terminal 20 is not limited to the smartphone as illustrated in FIG. 1, and may be devices such as a mobile phone terminal, a tablet terminal, a personal computer (PC), a game machine, a wearable terminal (smart eyeglass, smart band, smart watch, smart neck, or the like), for example. Furthermore, the user terminal 20 may be a robot resembling a human, various animals, various characters, or the like.

Figure 2:
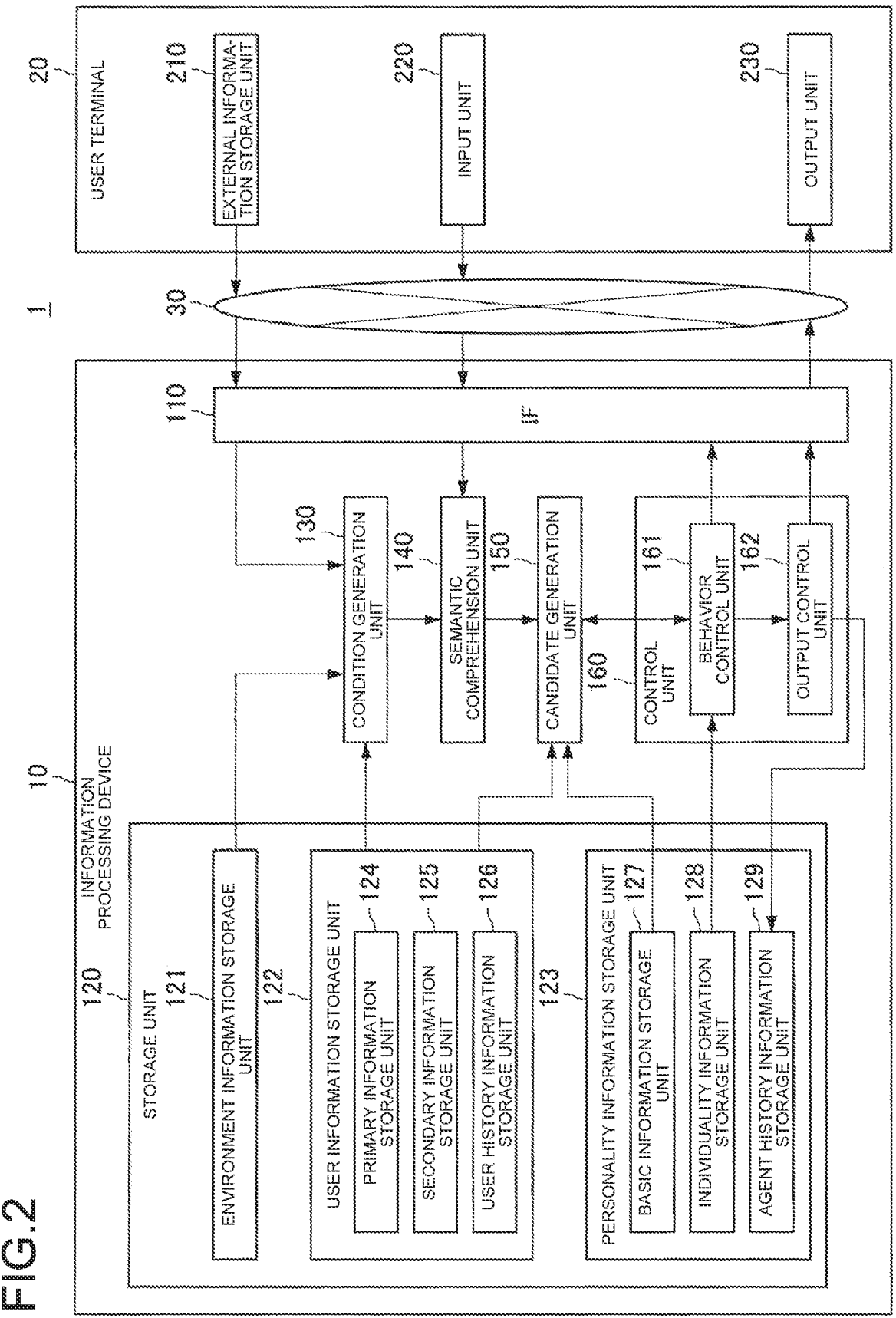
FIG. 2 is a functional block diagram illustrating configurations of an information processing device 10 and a user terminal 20 included in the information processing system 1 according to an embodiment of the present disclosure.

Next, a configuration of the information processing device 10 and the user terminal 20 according to an embodiment of the present disclosure will be described with reference to FIG. 2. FIG. 2 is a functional block diagram illustrating configurations of the information processing device 10 and the user terminal 20 included in the information processing system 1 according to an embodiment of the present disclosure.

(Information Processing Device)

The information processing device 10 has a function of storing user information related to the user and personality information defining a personality unique to the agent, and further controlling an externalized behavior that is a behavior externalized by the agent based on the personality information. The function is implemented by cooperation of an interface (IF) 110, a storage unit 120, a condition generation unit 130, a semantic comprehension unit 140, a candidate generation unit 150, and a control unit 160, which are included in the information processing device 10. Hereinafter, each of functional units included in the information processing device 10 will be described.

The IF 110 has a function of exchanging various types of information with various communication devices via the network 30. For example, the IF 110 exchange various types of information with various information processing terminals such as the user terminal 20 via the network 30. For example, the IF 110 can receive external information such as the location of the user or the time of world of the user from the user terminal 20. Furthermore, the IF 110 can receive various types of input information, which has been input by the user to the user terminal 20.

The storage unit 120 has a function of storing various types of information. The storage unit 120 stores personality information defining a personality unique to the agent, for example. Furthermore, the storage unit 120 may store environment information related to an environment in which the agent is placed and user information related to the user. The functions of the storage unit 120 are implemented by cooperation of an environment information storage unit 121, a user information storage unit 122, and a personality information storage unit 123, which are included in the storage unit 120.

Here, the motif of the personality imparted to the agent may be a character of works such as a cartoon, an animation, a game, a drama, or a movie, an entertainer or a celebrity who exists (or existed) in a real space, a historical person, or the like. Furthermore, the agent may be an animal or an anthropomorphic character. Furthermore, the agent may be a person reflecting the user's own personality, or a person reflecting the personality of another person such as a friend, family member, or acquaintance of the user.

The environment information storage unit 121 has a function of storing environment information of the world where the agent is present. The environment information includes various types of information related to the world of the agent, such as the time of the world of the agent, the location of the agent, or the situation where the agent is placed, for example. The environment information is referred to by the condition generation unit 130 as necessary.

The user information storage unit 122 has a function of storing user information related to the user of the user terminal 20. This function is implemented by cooperation of a primary information storage unit 124, a secondary information storage unit 125, and a user history information storage unit 126, which are included in the user information storage unit 122. The user information stored in the user information storage unit 122 is referred to by the condition generation unit 130 and the candidate generation unit 150 as necessary.

The primary information storage unit 124 stores user primary information that is formal information of the user as user information. The user primary information includes primary information obtained from user's input information, a behavior history, or the like, and may include, for example, information such as the age, gender, name, residential area, behavior history, or purchase history of the user.

The secondary information storage unit 125 stores user secondary information that is information accompanying the user primary information and that reflects the individuality of the user (information related to the individuality of the user). The user secondary information includes information estimated from the user primary information or the like, and may include, for example, information related to user's estimated preference, information related to the character or personality of the user, or information related to a classification of purchase by the user (for example, user's purchase classification information).

The user history information storage unit 126 stores user history information which is information related to a history of communication between the user and the agent. The user history information may include, for example, a history of a conversation between the user and the agent, a history of words used by the user, information indicating a meaning of the words used by the user, or the like. These pieces of information may be used for estimation of the user secondary information.

The user information storage unit 122 has been described as above. Note that, in a case where the user information storage unit 122 stores user information regarding a plurality of users, the user information storage unit 122 may store the user primary information, the user secondary information, and the user history information, separately for each of the users.

Furthermore, the configuration of the user information storage unit 122 is not limited to the example illustrated in FIG. 2. That is, the user information storage unit 122 does not have to divide the user information into the user primary information, the user secondary information, and the user history information at the time of storing the user information. For example, the user information storage unit 122 may store the user information classified as general user information and specific user information. Here, the general user information is default information related to characteristics of a standard or average user assumed by a service provider, rather than a specific user. The specific user information is information indicating a difference in information specific to the user, as compared to the characteristics of the standard or average user. For example, in a case where the user has an extroverted personality compared to the standard user, the specific user information may include information indicating that the user has an extraverted personality compared to the standard user.

The personality information storage unit 123 has a function of storing personality information defining a personality unique to the agent and agent history information related to a use history of the agent by the user. This function is implemented by cooperation of a basic information storage unit 127, an individuality information storage unit 128, and an agent history information storage unit 129, which are included in the personality information storage unit 123. Here, the phrase "the agent's personality is unique" means that the personality of a character can be fully demonstrated in an agent product that uses the personality of a character in a certain original work as a motif, which indicates having uniqueness with respect to other product groups. Alternatively, there is uniqueness in a case where a specific agent possessed by a certain user has specific personality information possessed only by the agent.

The personality information may be, for example, personality characteristic information of the agent, or may include information related to a use frequency of a word included in the phrase, a meaning of a word to be used, a way of speaking, or the like. Furthermore, the personality information may include information such as information related to behavior according to a preference of the agent, a location of the agent, a time of a world where the agent exists, a situation in which the agent is placed, or the like. In the present embodiment, when the personality information is stored in the personality information storage unit 123, the personality information is divided into basic information that defines a standard personality independent of an individual agent and individuality information that defines individuality of the agent.

The basic information storage unit 127 stores basic information defining an externalized behavior generally performed by an agent. More specifically, the basic information can be information defining various universal externalized behaviors that can be commonly performed by various agents, and can be information defining the basic personality of the agent. For example, the basic information may include information defining a word of a certain language such as Japanese and a representative meaning of the word in association with each other like a dictionary of the certain language. The basic information stored in the basic information storage unit 127 is transmitted to the candidate generation unit 150, and is used, for example, to generate a candidate for the content such as an utterance by an agent.

The individuality information storage unit 128 stores individuality information defining the individuality of the agent. More specifically, the individuality information is information indicating a difference in personality unique to the agent with respect to the basic personality of the agent. For example, the individuality information may include information indicating that a phrase that would be suggested to be used by an agent based on the personality of the agent is to be used with a higher probability than an agent having a basic personality. For example, the individuality information may include information indicating that an agent having an extraverted personality is likely to utter an extraverted phrase. Note that the basic information and the individuality information described above are also collectively referred to as the personality information. Note that the personality information can change with agent history information to be described below or with a use situation of the user.

An externalized behavior of the agent is controlled based on the personality information. Since the externalized behavior of the agent is controlled based on the individuality information in addition to the basic information, the externalized behavior of the agent will be controlled to an externalized behavior having further suitability to the individuality of the agent.

Here, the personality information may be information defined based on an original model related to the agent. For example, the personality information may be information defined based on the personality of a character that is an original model of the agent. With this, the externalized behavior of the agent is controlled to be an externalized behavior based on the original model related to the agent.

The agent history information storage unit 129 has a function of storing agent history information related to a history of communication between the user and the agent. The agent history information may include, for example, information related to a history indicating the number of times and duration of use of the agent by the user, a category of an instruction, instruction details, or the like.

In addition to the personality information and the agent history information, the personality information storage unit 123 may store bibliographic information related to the character that is the basis of the agent. The bibliographic information may include, for example, information related to agent's name, gender, age, graphics, or character settings (for example, setting of hometown, setting of family structure, or the like) related to the agent.

Furthermore, similarly to the user primary information, the user secondary information, and the user history information in the user information, the personality information storage unit 123 may classify the personality information related to the agent into agent primary information, agent secondary information, and agent history information when storing the information.

Furthermore, the personality information storage unit 123 may store personality information related to a plurality of agents. In this case, the personality information storage unit 123 may store, for example, basic information, individuality information, and agent history information related to each of the agents. Note that the personality information storage unit 123 may store one piece of basic information as basic information common to the plurality of agents.

Furthermore, there is a case where new user information is sent from the user terminal 20 to the information processing device 10. This occurs due to a case where the user information is updated by the new information input by the user, accumulated behavior histories, or the like. In this case, the user information stored in the user information storage unit 122 may be updated by adding the new user information to the originally stored user information. In this manner, the user information stored in the user information storage unit 122 changes in some cases.

The personality information stored in the personality information storage unit 123 does not have to be influenced by a change in the user information stored in the user information storage unit 122. More specifically, the personality information would not have to change even when the user information has changed. As will be described below, the externalized behavior of the agent is controlled based on the personality information. Since the personality information is not influenced by the change in the user information, the externalized behavior of the agent will be controlled to be an externalized behavior having further suitability to the individuality of the agent independently of the change in the user information.

Alternatively, the personality information of the agent may change with a change in the user information. In this case, the agent can follow the change of the user or behave as a personality matching the user's preference. Specifically, the generation of the personality information of the agent is performed with reference to the user information as well, and together with this, the personality information of the agent is also updated with the update of the user information.

The condition generation unit 130 has a function of generating condition information related to a precondition for the agent to perform an externalized behavior. The condition generation unit 130 generates the condition information by integrating the external information acquired from the user terminal 20 via the IF 110, the environment information acquired from the environment information storage unit 121, and the user information acquired from the user information storage unit 122. The generated condition information is transmitted to the semantic comprehension unit 140.

The semantic comprehension unit 140 has a function of performing semantic comprehension of the input information sent from the user terminal 20 based on the condition information. For example, the semantic comprehension unit 140 performs semantic comprehension on the word included in the user's input information based on the user information included in the condition information. The result of comprehension obtained by the semantic comprehension unit 140 is transmitted to the candidate generation unit 150 as semantic information.

The candidate generation unit 150 has a function of generating behavior candidates, which is candidates for the agent's externalized behavior based on the user information, the semantic information, and the basic information. For example, the candidate generation unit 150 generates, as the externalized behavior, an utterance by the agent as a behavior candidate. The generated behavior candidate is transmitted to a behavior control unit 161 included in the control unit 160. Note that the number of behavior candidates to be generated by the candidate generation unit 150 may be one or plural.

The control unit 160 has a function of controlling the externalized behavior of the agent based on the personality information of the agent and causing an output unit 230 included in the user terminal 20 to output the externalized behavior. The function is actualized by cooperation of the behavior control unit 161 and an output control unit 162, which are included in the control unit 160.

The behavior control unit 161 has a function of controlling the externalized behavior of the agent based on the personality information of the agent. More specifically, the behavior control unit 161 determines, from the candidates for the externalized behavior generated by the candidate generation unit 150, an externalized behavior to be output by the output unit 230 included in the user terminal 20 based on the individuality information of the agent. The information indicating the determined externalized behavior is transmitted to the output control unit 162 and then sent to the output unit 230 included in the user terminal 20 via the IF 110 and the network 30. This enables the externalized behavior of the agent to be output to the output unit 230. In this manner, the externalized behavior of the agent is controlled.

Here, an example of a method in which the behavior control unit 161 controls an externalized behavior in a case where the externalized behavior is an utterance by an agent will be described. Here, a case where the candidate generation unit 150 generates one behavior candidate will be described. For example, the behavior control unit 161 decides whether to determine a behavior candidate to an externalized behavior based on a matching degree between the behavior candidate generated by the candidate generation unit 150 and the individuality information of the agent, thereby controlling the externalized behavior by the agent. For example, in a case where the matching degree between the behavior candidate and the individuality information is low, the behavior control unit 161 may decide not to determine the behavior candidate as an externalized behavior. For example, in a case where the behavior candidate is an utterance having an introverted content even when the agent is an extraverted character and the individuality information includes information indicating an extraverted personality, the behavior control unit 161 may decide that the matching degree between the behavior candidate and the individuality information is low. In this case, the behavior control unit 161 may decide that the behavior candidate is not to be determined as an externalized behavior. At this time, the behavior control unit 161 may transmit request information requesting generation of a new behavior candidate to the candidate generation unit 150. The candidate generation unit 150 newly generates a behavior candidate according to the request information and transmits the generated behavior candidate to the behavior control unit 161.

In contrast, in a case where the matching degree between the behavior candidate and the individuality information is high, the behavior control unit 161 may decide to determine the behavior candidate as an externalized behavior. In this case, the behavior control unit 161 transmits information indicating the behavior candidate to the output control unit 162.

As described above, with the control of the externalized behavior by the decision made by the behavior control unit 161 as to whether to determine the behavior candidate as the externalized behavior based on the matching degree between the behavior candidate and the individuality information, the agent can perform the externalized behavior having further suitability to the personality of the agent.

The output control unit 162 has a function of causing various known output devices capable of outputting information to output an externalized behavior of an agent. For example, the output control unit 162 sends information indicating an externalized behavior to the output unit 230 included in the user terminal 20 via the IF 110 and the network 30, thereby controlling the output of the externalized behavior of the agent to the output unit 230 included in the user terminal 20. For example, the output control unit 162 sends information representing the utterance of the agent to the output unit 230, thereby enabling the output unit 230 to output a voice representing the utterance of the agent. Furthermore, the output control unit 162 sends information representing an image indicating a state in which the agent is performing an externalized behavior to the output unit 230, thereby enabling the output unit 230 to output an image indicating a state in which the agent is performing an externalized behavior. By outputting the agent's externalized behavior from the output unit 230 in this manner, the user of the user terminal 20 can recognize the agent's externalized behavior.

The functions of the information processing device 10 have been described as above. Next, functions of the user terminal 20 will be described.

The user terminal 20 has a function of sending the acquired external information or input information to the information processing device 10. Furthermore, the user terminal 20 has a function of outputting an externalized behavior of the agent based on the information received from the information processing device 10. The function is actualized by cooperation of an external information storage unit 210, an input unit 220, and the output unit 230, which are included in the user terminal 20.

The external information storage unit 210 has a function of storing external information. The external information is information of the world in which the user exists, different from the world in which the agent exists, and may include, for example, various types of information such as the location of the user, the time of the world in which the user exists, or an event in which the user participates. The external information is sent to the IF 110 via the network 30 and then transmitted to the condition generation unit 130.

The input unit 220 has a function of inputting various types of information from the user. For example, the input unit 220 may include a sound acquisition device having a function of acquiring various sound waves such as the voice of the user. The sound acquisition device is, for example, a device having a function of acquiring various known sounds, such as a microphone. Furthermore, the input unit 220 may be a device having a function of inputting various known information, such as a keyboard or a mouse. The information input by the device may be, for example, text information represented by a character string or the like. The information input to the input unit 220 is transmitted to the IF 110 included in the information processing device 10 via the network 30 and then transmitted to the semantic comprehension unit 140.

The output unit 230 has a function of outputting an externalized behavior of the agent. For example, the output unit 230 may include a sound output device having a function of outputting various known sounds, such as a speaker. The sound output device outputs the content of the utterance, which is the externalized behavior of the agent, as a voice. Furthermore, the output unit 230 may include various known image output devices having a function of outputting an image. The image output device outputs, for example, an image representing an externalized behavior of an agent, which is an externalized behavior of the agent. The output unit 230 outputs the externalized behavior of the agent, whereby the user can recognize the externalized behavior of the agent.

The outline of the configurations of the information processing device 10 and the user terminal 20 included in the information processing system 1 has been described as above.

1.2. Generation of Personality Information

Next, an example of a method of generating the personality information of the agent will be described with reference to FIG. 3. FIG. 3 is a flowchart illustrating an example of a method of generating the personality information of the agent. Hereinafter, a method of generating the personality information will be described with reference to the flowchart of FIG. 3.

First, agent information, which is information related to an agent, is prepared (step S101). For example, the agent information to be prepared includes original story information such as an original story related to an agent, setting information such as a character appearing in the original story, or the like. Furthermore, in a case where the agent has no original story, agent information may be newly defined.

Next, the personality information is learned or set based on the agent information (step S103). For example, the personality information may be generated based on various known machine learning algorithms. Furthermore, the personality information may be set in a format in which various parameters defining the personality information are directly input based on the agent information, under the supervision of an author, for example. The personality information of the agent is generated as described above.

Next, three examples of a method of controlling the externalized behavior of the agent using the personality information will be briefly described.

A first method is a method of referring to the generated personality information and generating an externalized behavior such as an utterance or an action of an agent from the personality information. For example, an externalized behavior such as utterance having suitability to the personality of the agent is generated based on the personality information.

The second method is a method in which the individuality information apples bias on the probability of generating the externalized behavior with respect to the standard externalized behavior generated based on the basic information of the agent. For example, in a case where the agent's personality is an extraverted personality, the externalized behavior is controlled so as to utter more diplomatic content.

A third method is a method of performing a correction based on individuality information such that an inappropriate candidate that does not match the personality information among candidates for an externalized behavior generated based on the basic information of an agent would not be determined as an externalized behavior. For example, when the agent is an extraverted personality and the candidate for the externalized behavior generated based on the basic information is an introverted externalized behavior, the externalized behavior is controlled such that the externalized behavior will not be performed by the agent.

The three methods for controlling the externalized behavior of the agent based on the personality information have been described as above. In an embodiment of the present disclosure, control of an externalized behavior of an agent according to the third method will be described.

1.3. Processing Example

Hereinafter, an example of processes performed by the information processing device 10 according to an embodiment of the present disclosure will be described with reference to FIGS. 4 to 6. FIG. 4 is a flowchart illustrating an example of processes performed by the information processing device 10 according to an embodiment of the present disclosure. Hereinafter, a processing example will be described with reference to the flowchart of FIG. 4.

First, the condition generation unit 130 acquires information (step S201). More specifically, the condition generation unit 130 acquires the external information sent from the user terminal 20, the environment information transmitted from the environment information storage unit 121, and the user information transmitted from the user information storage unit 122.

Next, the condition generation unit 130 integrates the pieces of information acquired in step S201 to generate condition information (step S203). The generated condition information is transmitted to the semantic comprehension unit 140.

Next, the semantic comprehension unit 140 performs semantic comprehension on the content of the input information which has been input to the user terminal 20 (step S205). More specifically, the semantic comprehension unit 140 acquires the input information that has been input to the user terminal 20 by the user, and performs semantic comprehension on the content of the input information based on the condition information. The semantic information as the result of comprehension obtained by the semantic comprehension unit 140 is transmitted to the candidate generation unit 150.

Next, the candidate generation unit 150 generates a behavior candidate (step S207). More specifically, the candidate generation unit 150 generates a candidate for the agent's behavior based on the semantic information, the user information, and the personality information. As an example, the following will describe the generation assuming that the candidate generation unit 150 generates one utterance candidate, which is a candidate for the content to be uttered by the agent, as the behavior candidate. Note that the candidate generation unit 150 may generate a plurality of behavior candidates. Information indicating the generated utterance candidate is transmitted to the behavior control unit 161 included in the control unit 160.

Next, the behavior control unit 161 corrects the utterance candidate based on the individuality information (step S209). For example, the behavior control unit 161 decides whether to determine the utterance candidate as the externalized behavior based on the matching degree between the utterance candidate generated by the candidate generation unit 150 and the individuality information. For example, the candidate generation unit 150 calculates a matching degree between the utterance content and the individuality information, and compares the calculated matching degree with a threshold. For example, when the matching degree between the utterance candidate and the individuality information is low and the matching degree is lower than the threshold, the candidate generation unit 150 would not determine the utterance candidate as an agent's externalized behavior. In this case, the behavior control unit 161 may request the candidate generation unit 150 to generate a new utterance candidate. In a case where the candidate generation unit 150 generates a new utterance candidate, the behavior control unit 161 corrects the new utterance candidate. In contrast, when the matching degree between the utterance candidate and the individuality information is high and the matching degree is a threshold or more, the behavior control unit 161 determines the utterance candidate generated by the candidate generation unit 150 as the externalized behavior, which is the behavior externalized by the agent. In this case, the behavior control unit 161 transmits information indicating the utterance candidate to the output control unit 162. Information indicating the utterance candidate is transmitted to the IF 110 and then sent to the output unit 230 included in the user terminal 20 via the network 30.

In this manner, the behavior control unit 161 controls the externalized behavior of the agent by deciding whether to determine the behavior candidate as the externalized behavior based on the matching degree between the individuality information and the behavior candidate which is a candidate for the externalized behavior (for example, an utterance behavior) generated based on the basic information. This achieves the control of the externalized behavior to enable the agent to perform the externalized behavior having a higher matching degree with the agent's individuality.

Next, the output unit 230 outputs an agent's utterance (step S211). For example, the output unit 230 outputs an image representing the agent, and outputs a voice so that the agent utters the content of the utterance candidate received in step S209. With this operation, the user can recognize the utterance of the agent together with the image of the agent.

Next, an additional process is performed (step S213). The additional process may be performed in a case where it is not easy to decide whether the matching degree between the utterance candidate and the individuality information is high or low. More specifically, the additional process may be performed in a case where the matching degree between the utterance candidate and the individuality information calculated in step S211 is a value near a threshold. That is, when the matching degree is not a value near the threshold, the additional process will not have to be performed.

In the additional process, the supervisor such as the author of the agent or the user checks the acceptability of the utterance candidate. The acceptability is a degree of appropriateness of the agent's utterance of the content of the externalization candidate in consideration of the agent's personality.

Figure 5:
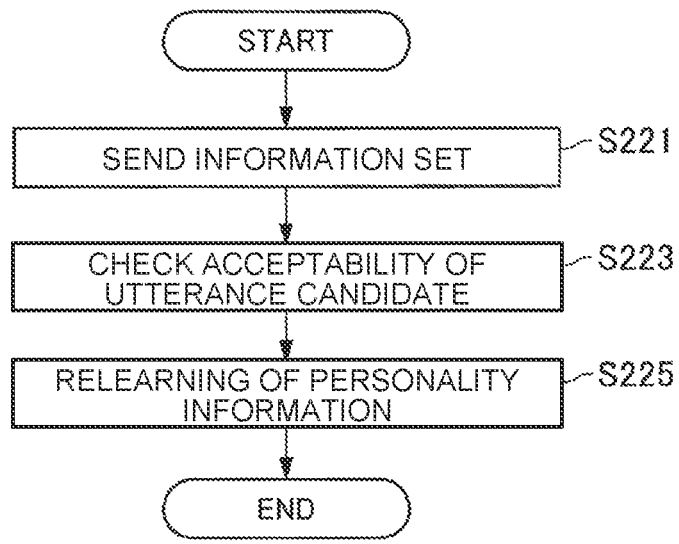
FIG. 5 is a flowchart illustrating a first additional process.
Figure 6:
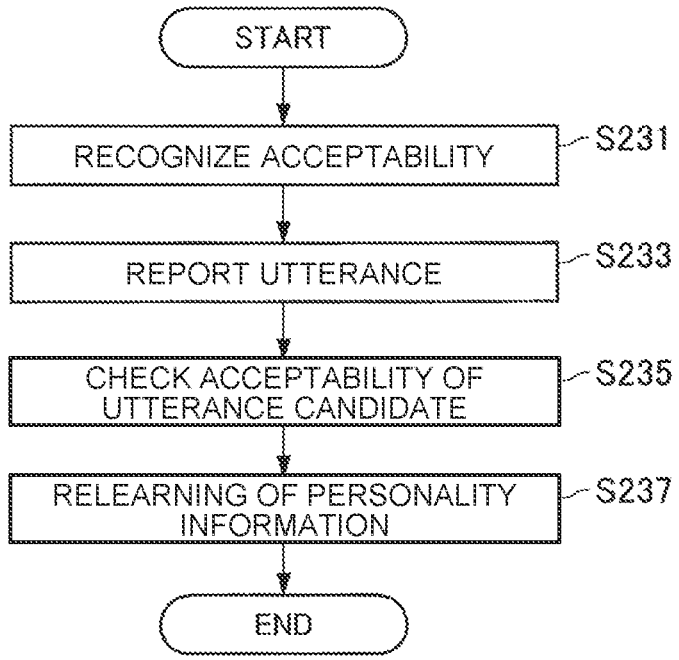
FIG. 6 is a flowchart illustrating a second additional process.

In step S213, the process of the flowchart illustrated in either FIG. 5 or FIG. 6 may be selectively executed as appropriate. FIG. 5 is a flowchart illustrating a first additional process. FIG. 6 is a flowchart illustrating a second additional process. First, the first additional process will be described with reference to the flowchart illustrated in FIG. 5.

First, the behavior control unit 161 sends information related to an agent (for example, information related to the name or personality of the agent, or the like) and information indicating an utterance candidate, as an information set (step S221). The information set is sent to, for example, an information processing terminal (not illustrated) used by a supervisor (for example, the author of the agent) of the agent via the IF 110 and the network 30. The information set is output to the information processing terminal of the supervisor, enabling the supervisor to recognize the content of the information set.

Next, the acceptability of the utterance candidate is confirmed based on the information set (step S223). More specifically, the supervisor may confirm the acceptability of the utterance candidate by confirming the appropriateness of the content of the externalization candidate based on the personality of the agent. For example, in a case where the utterance candidate is not appropriate in light of the agent's personality, the supervisor determines that the acceptability of the utterance candidate is low. In contrast, in a case where the utterance candidate is appropriate in light of the personality of the agent, the supervisor determines that the acceptability of the utterance candidate is high.

Next, based on the confirmation result in step S223, relearning of the personality information is performed (step S225). For example, the confirmation result may be sent to the personality information storage unit 123 included in the information processing device 10 in step S223, and the personality information storage unit 123 may relearn the personality information based on various known machine learning algorithms using the confirmation result as input data. As a result, the personality information stored in the personality information storage unit 123 is updated based on the confirmation result by the supervisor.

Furthermore, the confirmation result may be accumulated in a device different from the information processing device 10 illustrated in FIG. 2. When a predetermined amount of confirmation results are accumulated in the device, the personality information is relearned in the device. It is also allowable to send the relearned personality information to the information processing device 10 and then transmitted to the personality information storage unit 123, whereby the personality information already stored in the personality information storage unit 123 may be updated to the relearned personality information.

The first additional process illustrated in FIG. 5 has been described as above. In the first additional process, the supervisor confirms the acceptability of the utterance candidate. For example, it is allowable to measure a ratio of utterance candidate unintended by the supervisor (utterance candidate with low acceptability) among a given amount of utterance candidates (for example, 1000 utterance candidates). For example, when the ratio of utterance candidates unintended by the supervisor among the given amount of utterance candidates falls below a predetermined ratio (for example, 1%), the personality information may be determined to be acceptable.

The first additional process has been described as above with reference to FIG. 5. Next, the second additional process will be described with reference to FIG. 6.

First, the user of the user terminal 20 confirms the acceptability of the agent's utterance in light of the personality of the agent (step S231).

Next, the information related to the utterance of the agent output by the user terminal 20 is reported to the supervisor (step S233). For example, information related to the utterance of the agent is sent from the user terminal 20 to the information processing terminal used by the supervisor. The information relate to the utterance includes information related to the content of the agent's utterance, the acceptability confirmed in step S231, preconditions, or the like. The information related to these utterances may be transmitted to the information processing terminal used by the supervisor in association with a time stamp.

Next, the processing of steps S235 and S237 is performed. Since the processes of steps S235 and S237 are substantially the same as the processes of steps S223 and S225 described with reference to FIG. 5, the description thereof is omitted here. When the process of step S237 ends, the second additional process illustrated in FIG. 6 ends.

When the additional process illustrated in FIG. 5 or 6 ends, the process returns to FIG. 4, the process of step S213 ends, and the process illustrated in FIG. 4 ends. The processes of the information processing device 10 according to an embodiment of the present disclosure has been described as above.

Note that, although an example in which the agent performs an utterance as an externalized behavior has been described here, the present invention is not limited thereto, and the agent may perform an externalized behavior other than the utterance. For example, in a case where the agent is, for example, a robot character, the agent may perform behavior expressing curiousness, behavior of expressing aggressiveness, an empathic action, or the like as an externalized action. In addition, the agent may use body gestures including a hand gesture as an externalized behavior. In addition, the agent may make a facial expression as an externalized behavior. Furthermore, the agent may perform, as an externalized behavior, a recommendation behavior of recommending various behaviors, objects, events, or the like to the user.

1.4. Effects

The information processing device 10 according to an embodiment of the present disclosure controls an agent's externalized behavior based on personality information of the agent. Therefore, the externalized behavior is controlled before the externalized behavior of the agent is output to the user.

2. Variations in Examples of Generating Personality Information

The above embodiment has described an example of the method of generating personality information of the agent with reference to FIG. 3. Here, variations of the method of generating personality information will be described with reference to FIGS. 7 to 12.

First, a first method of generating personality information will be described with reference to FIG. 7. FIG. 7 is a flowchart illustrating a first method of generating personality information. Hereinafter, description will be given following the flowchart of FIG. 7.

First, learning data is prepared (step S301). Here, the learning data may be, for example, information related to setting material of the original story of the agent. For example, the original setting material may be a set of phrases. More specifically, the learning data may include fragmented phrase appearing in the original story of the agent. Furthermore, the learning data may include information related to a condition of utterance of the phrase. The information related to the condition may include, for example, information related to an emotion (for example, danger, temptations, security, or the like) of an agent when the agent utters a phrase. Furthermore, the learning data may include information related to a counterpart to which the phrase is uttered. Furthermore, the learning data may include information related to a type of an initiating word (that is, the phrase from the agent's counterpart) which was made to the agent, to which the reply is given. The learning data may be prepared by a supervisor such as an author of the agent, for example.

Next, the learning data is identified based on the five-factor model (step S303). Here, the five-factor model is a model that defines a personality based on five factors of extroversion, neuroticism, conscientiousness, agreeableness, and openness. Here, the learning data is identified based on the information related to the phrase, which is the learning data prepared in step S301, and the score of the five factors is specified. For example, in a case where many positive expressions are included in a phrase, a high score may be given to the extroversion. Furthermore, in a case where many negative expressions are included in the phrase, a high score may be given to the neuroticism. The score for the five factors may be given by the author, for example. In addition, scores for the five factors may be given based on various known machine learning algorithms.

Next, personality information is generated (step S305). More specifically, personality information is generated based on the scores of the five factors specified in step S303. Here, the role of the personality information will be described. Each of five factors indicates, by its magnitude of the score, the possibility that various words or combinations of words (hereinafter, these are also collectively referred to simply as "words") will be uttered. Therefore, the personality information has a role of defining a probability that various words will be uttered by the agent. For example, a high score given to an extroversion factor indicates high probability that a positive word will be uttered by the agent. With such personality information stored in the personality information storage unit 123, the agent's externalized behavior is controlled based on the personality information generated based on a five-factor model.

Note that the five-factor model defines an agent's behavior under a specific situation. Therefore, when the externalized behavior such as the utterance is actually controlled by the information processing device 10, for example, the externalized behavior such as the utterance may be controlled in consideration of the specific situation.

Here, although the learning data is identified based on the five-factor model, the present invention is not limited to this. The learning data may be identified based on various known personality theories such as the MBTI and the Enneagram. In addition, the learning data may be identified based on a theory of emotion such as Russell's circumplex model. Furthermore, the model used for identifying the learning data may be various models such as a predetermined model defined by the user, a model similar to a model defined for any of existing characters, or a model based on a feature amount acquired by machine learning.

Next, a second method of generating personality information will be described with reference to FIG. 8. FIG. 8 is a flowchart illustrating the second method of generating personality information. Hereinafter, the second method of generating personality information will be described with reference to the flowchart of FIG. 8.

First, learning data is prepared (step S401). Since the process of step S401 is substantially the same as the process of step S301 described with reference to FIG. 7, the description thereof is omitted here.

Next, the personality information is generated based on the learning data prepared in step S401 and a machine learning algorithm (step S403). Here, the role of the generated personality information will be described. The personality information defines the probability of generating a combination of appropriate phrase or words as an agent's utterance content in a certain situation or a response to the user's input. In generating the personality information, the probability is defined as a space of probability of a phrase or a word that likely to be uttered by a character in the original story based on the appearance frequency of the phrase or a word uttered by the character, a combination of utterances or answers in a specific situation or to an utterance of another character, or the like. With these processes, the agent can perform an externalized behavior similar to the externalized behavior performed by the character of the agent in the original story.

Next, a third method of generating personality information will be described with reference to FIG. 9. In the third method of generating personality information, a scenario of the agent is generated based on the personality information. Furthermore, the personality information is relearned based on the scenario. The third method of generating personality information will be described with reference to FIG. 9. FIG. 9 is a flowchart illustrating the third method of generating personality information. Hereinafter, description will be given with reference to FIG. 9.

First, personality information is prepared (step S501). A method for generating the personality information prepared here is not particularly limited. For example, the personality information may be generated by the first or second method of generating personality information described with reference to FIG. 7 or FIG. 8.

Next, a scenario is generated based on a machine learning algorithm (step S503). In machine learning, the personality information prepared in step S501 is used as input data. The scenario generated here may be a situation that can be suggested from the original story of the agent, or may be a scenario in a situation that can be suggested from the original story the agent but does not exist in the original story of the agent. For example, the scenario may be a virtual interaction or story in various situations such as a situation where an agent performs route guidance, a situation where the agent recommends a certain content, or the like.

Next, based on the scenario generated in step S503, the personality information is relearned based on the machine learning algorithm (step S505). The scenario generated in step S503 can be a scenario that does not exist in the original story of the agent. Therefore, by using the personality information generated based on the scenario generated in step S503, it would be possible to allow the agent to perform an externalized behavior along the concept of the agent even in a scenario that does not exist in the original story.

Figure 10:
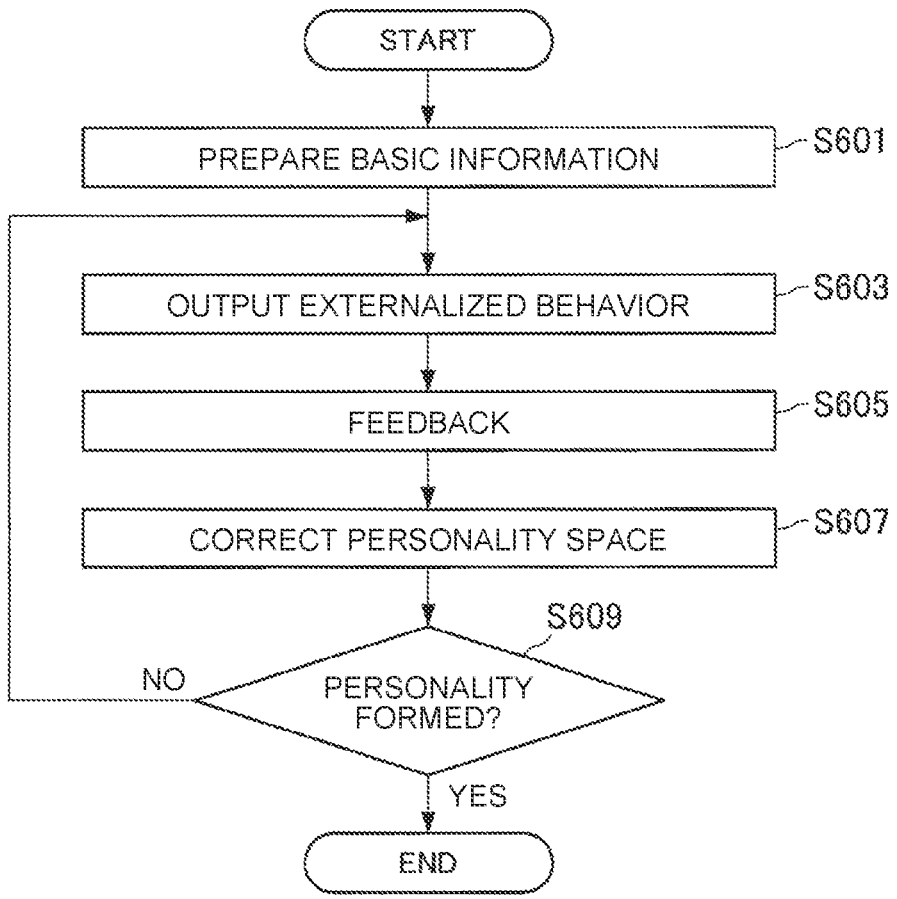
FIG. 10 is a flowchart illustrating a fourth method of generating personality information.

Next, a fourth method of generating personality information will be described with reference to FIG. 10. FIG. 10 is a flowchart illustrating the fourth method of generating personality information.

First, basic information is prepared (step S601). Here, the basic information may be information indicating the lexical meaning of a word. That is, the basic information may be information that does not define the individuality of the agent.

Next, the agent is directed to output an externalized behavior based on the basic information (step S603). The output of the externalized behavior may be performed by displaying an image representing the externalized behavior of the agent on the image output device, or by outputting the voice of the agent to the sound output device. The externalized behavior is recognized by the supervisor such as the author of the agent, for example.

Next, feedback as to whether the externalized behavior is preferable is performed (step S605). Regarding the decision, for example, the supervisor may perform the feedback based on a concept suggested from the original story of the agent or the like. More specifically, the supervisor may determine whether or not the externalized behavior is a behavior suitable for the concept of the agent.

Next, the personality information is corrected based on the externalized behavior output in step S603 and the feedback performed in step S605 (step S607). For example, the personality information may be corrected so as to lower the frequency at which the word or the combination of words decided to be unfavorable in step S605 occurs as an externalized behavior. Furthermore, the correction of the personality information may be associated with environment information. More specifically, for example, the personality information may be corrected so that the occurrence frequency of a certain word decreases in a certain situation, but the occurrence frequency of the word does not change in other situations. Note that the formed personality information may be generated as information indicating a difference from the basic information prepared in step S601.

Here, an application example of the generated personality information will be described. For example, in the product development stage, the personality information of the agent can be generated based on the interaction between the supervisor and the agent. That is, the supervisor can correct the personality information while interacting with the agent along the flowchart illustrated in FIG. 10. Note that the supervisor may be an author who has created a character that is the original of the agent, may be a provider who provides the agent to the user, or may be the user of the user terminal 20. In a case where the supervisor is the user, the user can generate the personality information with fun. Furthermore, in a case where the supervisor is the user, the user can handle the agent as the content generated by the user by selling the personality information generated by the user, for example. These application examples may be applied to, for example, a game such as a character raising or training game or a virtual idol game. The user can update the personality information at an arbitrary time point regardless of the progress status of the game.

Figure 11:
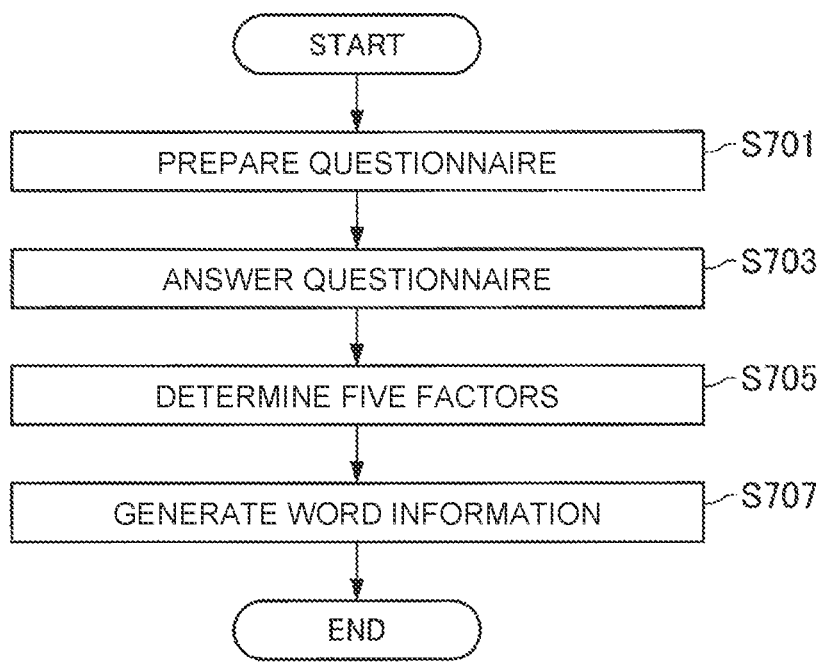
FIG. 11 is a flowchart illustrating a fifth method of generating personality information.

Next, a fifth method of generating personality information will be described with reference to FIG. 11. FIG. 11 is a flowchart illustrating the fifth method of generating personality information. Hereinafter, description will be given following the flowchart of FIG. 11.

First, a questionnaire is prepared (step S701). For example, the questionnaire may include a question about character's tendency or behavior or a question about a score of five factors.

Next, a questionnaire is answered (step S703). The questionnaire is answered by, for example, the author of the character.

Next, five factors of the character are determined based on the result of answers to the questionnaire (step S705). When the result of answers includes the five-factor score in a direct manner, the score may be determined as the five-factor score. Furthermore, the score of the five factors may be determined based on information such as the character's tendency, behavior, or the like answered in step S703.

Next, word information is generated based on the five factors determined (step S707). Here, the word information is information that defines the frequency or situation in which various words are used by the agent. Here, the word information is generated by using word information regarding each of scores of the five factors. The word information regarding each of the scores of the five factors is, for example, information that defines the frequency and situation in which various words are used according to the score of the five factors. For example, in a case where the extroversion factor is high, there is a known tendency that a specific positive word is likely to be uttered. The word information is generated based on the scores of the five factors determined in step S705 and the word information regarding each of the scores. Note that the word information may be included in the personality information.

Figure 12:
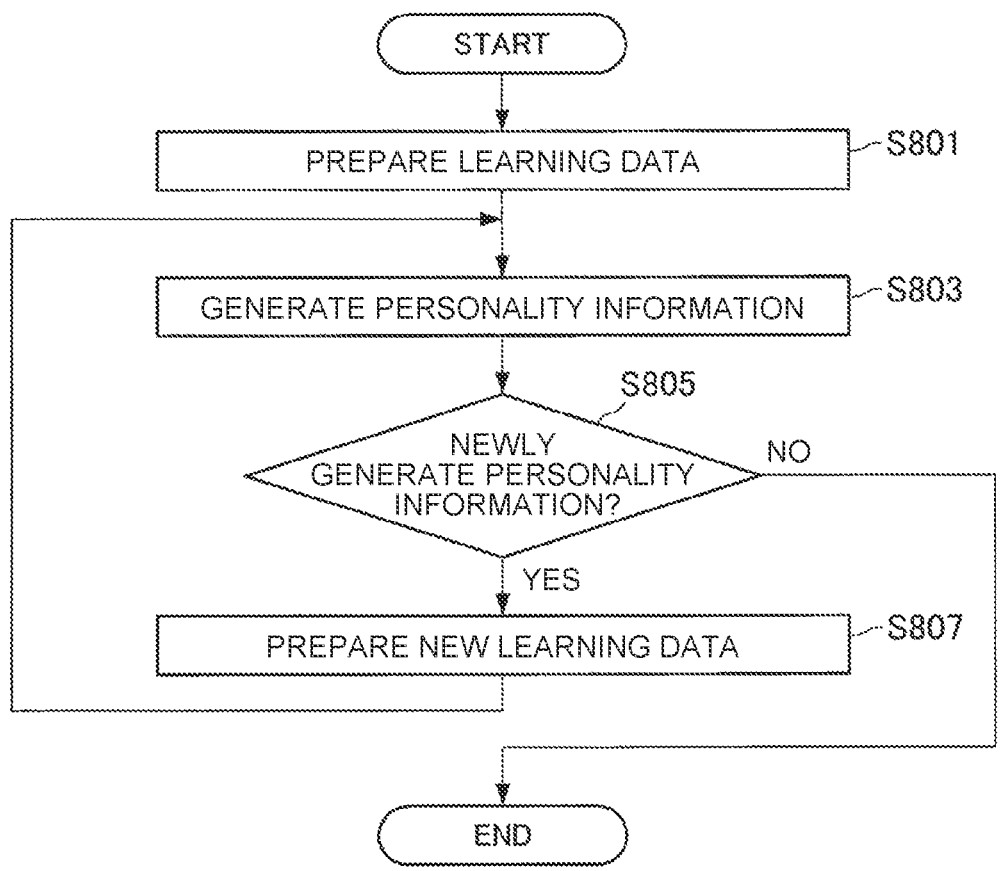
FIG. 12 is a flowchart illustrating a sixth method of generating personality information.

Next, an application example of the method for generating the personality information will be described with reference to FIG. 12. FIG. 12 is a flowchart illustrating a sixth method of generating personality information. Here, it is assumed that the personality of the agent changes stepwise together with the growth of the agent, or the like. For example, it is assumed, in the original story, that a character has growth stages of childhood, adolescence, and adulthood, and a character might have dissimilar personalities in individual growth stages. Here, the agent also has dissimilar personalities in individual growth stages, like the original story. According to the sixth method of generating personality information, it is possible to generate the personality information stepwise in accordance with the growth stage of the agent, or the like. Hereinafter, the sixth method of generating the personality information will be described with reference to FIG. 12.

First, learning data is prepared (step S801). For example, information related to phrases in the setting information of the original story and the like is prepared as learning data. For example, a phrase or the like in a childhood, which is an initial stage of a growth stage of an agent, are prepared as learning data in a product at a shipping stage of a product by which a service using the agent is provided, by a service provider of the agent.

Next, personality information is generated based on the machine learning algorithm (step S803). In a case where the previous processing is the processing in step S801, the personality information is generated based on the machine learning algorithm using the learning data prepared in step S801 as input data. For example, the personality information is generated based on the learning data originally prepared by the service provider.

In contrast, in a case where learning data is newly prepared in the processes of steps S805 to S807 described below, the personality information is generated using the newly prepared learning data as input data. For example, when the agent service is provided to the user, the personality information is generated based on new learning data prepared together with to the progress of the service.

The next step is to decide whether to newly generate personality information (step S805). For example, the decision whether to newly generate the personality information may be made according to the stage of character's personality information (for example, personality information in childhood, adolescence, adulthood, or the like). For example, in a case where the personality information is the personality information generated based on the learning data prepared in step S801 (for example, personality information generated based on learning data at the shipment stage), a decision of newly generation of personality information may be made. In contrast, in a case where the growth stage of the agent is at the final stage (for example, the adulthood) by repeatedly performing the processes of steps S803 to S807, new personality information would not have to be generated. When no new personality information is to be generated (step S805: No), the process of FIG. 12 ends. In contrast, when new personality information is to be generated (step S805: Yes), the process proceeds to step S807.

When it is decided in step S805 that new personality information is to be generated (step S805: Yes), new learning data is prepared (step S807). The new learning data may be, for example, information such as a phrase according to the growth stage of the personality of the agent. For example, in a case where the already generated personality information is personality information of the childhood of the agent, the new learning data may be learning data related to the adolescence of the agent. Furthermore, in a case where the already generated personality information is personality information of the adolescence of the agent, the new learning data may be learning data related to the adulthood of the agent.

Next, the process returns to step S803, and personality information is generated based on the new learning data. For example, in a case where the new learning data is learning data related to adolescence, personality information related to adolescence is to be generated. At this time, for example, in a case where the already generated personality information is the personality information of the childhood, the personality information of the childhood is to be updated to the personality information of the adolescence. In this manner, according to the sixth method of generating the personality information, the personality information can be updated in accordance with the change in the personality of the agent. Note that, in a case where the new learning data is learning data related to the adulthood, personality information related to adulthood is to be generated in step S803. At this time, in a case where the already generated personality information is the personality information of the adolescence, the personality information of the adolescence is to be updated to the personality information of the adulthood.

Note that the personality information generated based on the new learning data may be replaced with the already generated personality information, or may coexist with the already generated personality information. Furthermore, the update of the personality information may be performed based on a predetermined trigger. The trigger may be, for example, various conditions such as passage of time or passage of the number of conversations between the user and the agent.

The six methods of generating personality information have been described as above. Here, supplementary notes for the method of generating personality information will be given. For example, the original setting material used as the learning data does not have to be a phrase. For example, the original setting material may be a material related to a character setting collection, a relationship with other characters, a character's tendency, or the like. Furthermore, the original setting material may include a material generated by extracting the character's tendency based on a behavior such as utterance of the character in the original story. Furthermore, the setting material of the original story may include various types of setting information such as character's family structure, a hometown, a brief profile, specialties, or favorites.

Furthermore, the character on which the agent is based is not limited to an imaginary character, and may be a real person. For example, the personality information of a real person may be generated by analyzing a behavior such as an actual utterance or behavior of the real person. For example, personality information may be generated by analyzing a personality characteristic, an utterance habit, or the like of a real person such as a TV person or an idol using the first or second method of generating personality information. The personality information is stored in the personality information storage unit 123 included in the information processing device 10. Furthermore, in a case where the personality information related to an actual person is generated, the actual person may supervise the personality information as the supervisor.

Heretofore, examples of controlling the externalized behavior of the agent based on the personality information of the agent has been described. Not limited to this, the externalized behavior of the agent may be controlled based on information other than the personality information. For example, the externalized behavior of the agent may be controlled based on prohibition information related to words or behaviors that prohibit an externalized behavior by the agent. For example, the prohibition information may be held as information different from the personality information, or may be generated in advance as a part of the personality information. In a case where the prohibition information is held as information different from the personality information, the prohibition information may be appropriately updated independently of the personality information so as to be added or updated to the agent. Note that the prohibition information is not limited to prohibited words or phrases, and may include information related to behavior or action to be prohibited. Note that the prohibited words are not limited to words that are not preferable to be uttered by the agent, and it would be allowable to define words that are not preferable to be used by the user (words containing "desire to die", or "desire to kill", for example). In this case, how the agent should behave is defined in the personality information so as not to conflict with the prohibition information. Furthermore, the behavior may be different depending on the agent.

Furthermore, in a case where the original story of the character progresses and the learning data as a basis of the personality information stored in the personality information storage unit 123 has increased, the personality information may be updated by performing additional learning, which is additional learning, on the already generated personality information. For example, the personality information updated by the additional learning may be sent to the information processing device 10 via the network 30 or the like and transmitted to the personality information storage unit 123, whereby the personality information stored in the personality information storage unit 123 may be updated.

3. Application Examples

Hereinafter, application examples of the embodiment of the present disclosure described with reference to FIGS. 1 to 6 will be described.

3.1. First Application Example (Update of Personality Information)

Figure 13:
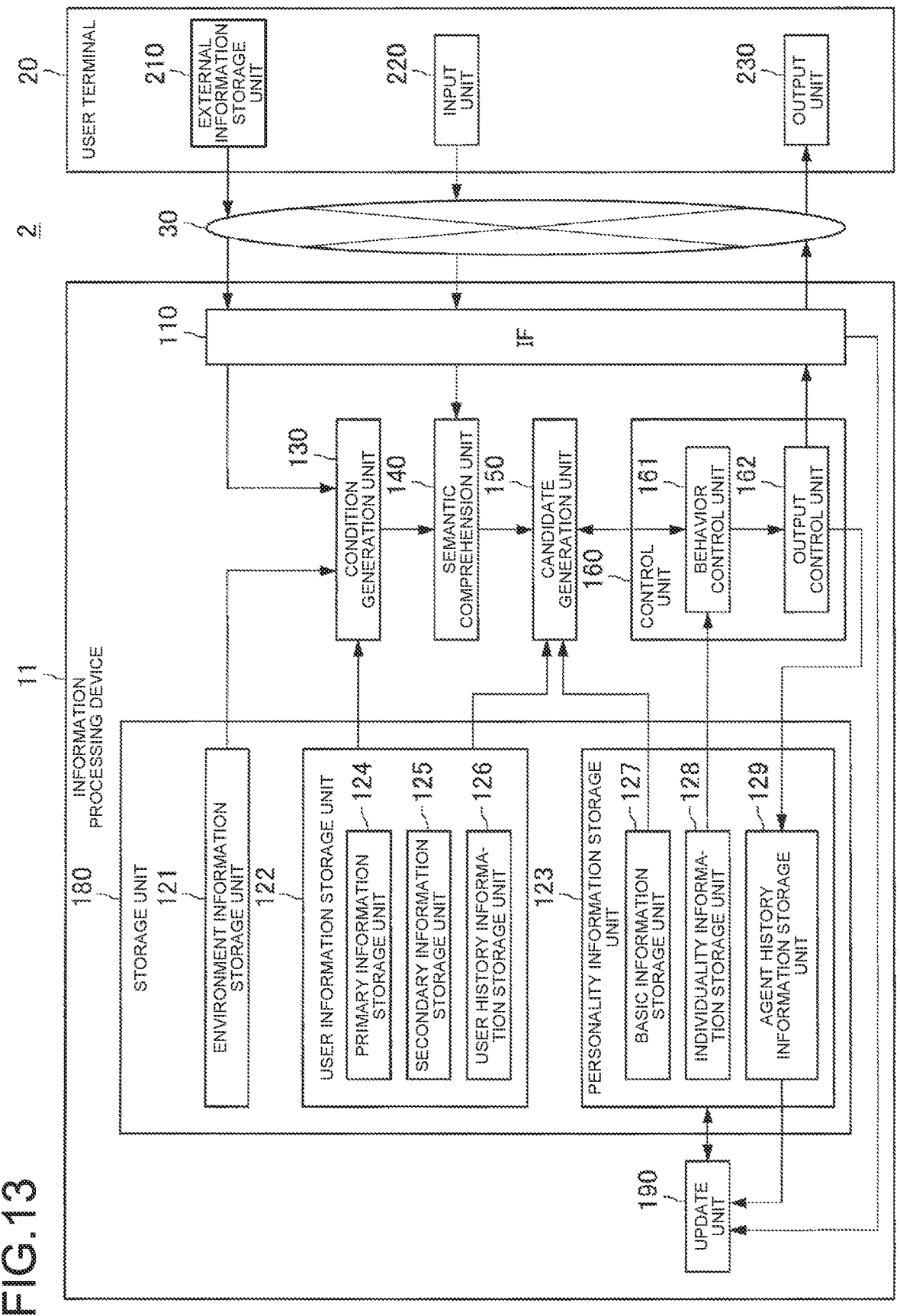
FIG. 13 is a block diagram illustrating configurations of an information processing device 11 and a user terminal 20 included in an information processing system 2 according to a first application example.

First, as a first application example, an example in which the personality information is updated will be described with reference to FIG. 13. FIG. 13 is a block diagram illustrating configurations of an information processing device 11 and a user terminal 20 included in an information processing system 2 according to the first application example.

The configuration of the information processing device 11 according to the first application example is different from the configuration of the information processing device 10 illustrated in FIG. 2 in that the information processing device 11 according to the first application example includes an update unit 190.

The update unit 190 has a function of updating the personality information stored in the personality information storage unit 123. The behavior control unit 161 controls the externalized behavior of the agent based on the updated personality information. Accordingly, even with occurrence of various changes including a change in the state of the growth stage of the agent or the like and a change in the world of the user (for example, a change of trends, or the like), the personality is appropriately updated to enable the user to enjoy the externalized behavior of the agent without discomfort or strange feeling. While the above embodiment mainly describes an example in which the agent makes an utterance as an externalized behavior, what is updated by the update unit 190 is not limited to information related to the agent's utterance included in the personality information. The update unit 190 may update behavior information related to various behaviors that can be performed by the agent, such as externalization of facial expression by the agent. This makes it possible to further appropriately control the externalized behavior of the agent.

Furthermore, the update unit 190 may update the prohibition information. For example, the update unit 190 may update the prohibition information so as to avoid execution of a behavior such as an unfavorable utterance or action, by the agent. More specifically, in a case where there is a problem in the content of a behavior such as an utterance or an action defined in the personality information, the update unit 190 may update the prohibition information so as to suppress the behavior. Examples of the case where there is a problem include utterances and behaviors that are not ethically or socially preferable, such as expressions unfavorable in fairness or ethical viewpoints, expressing containing political intentions, or expressions considered unfavorable from a cultural background. With such expressions changing depending on the times and the use environment, the prohibition information is to be updated by the update unit 190, which enables the agent to perform behaviors according to the change of the times, for example.

Furthermore, the external device of the information processing device 11 according to the first application example or a storage unit 180 included in the information processing device 11 may collect information related to unfavorable utterances or behaviors based on a report from the user for a certain period of time. The update unit 190 updates the personality information based on the collected information. Note that the updated personality information may be replaced with the original personality information, or may be stored in the personality information storage unit 181 in addition to the original personality information.

Furthermore, the update unit 190 may update information related to trends with regard to the personality information. For example, the update unit 190 may update the personality information so as to increase the frequency at which a trending word will be used as an externalized behavior by the agent. Furthermore, the update unit 190 may update the personality information so as to decrease the frequency at which the obsolete wording will be used as the externalized behavior by the agent. Furthermore, the update unit 190 may update the personality information so that the agent uses a new word that has been recently introduced to the world, a quick one-liner joke, or the like, as an externalized behavior. In this manner, the update unit 190 updates the information related to the trends with regard to the personality information, enabling the agent to perform an externalized behavior in accordance with the trends.

Furthermore, the update unit 190 may update the personality information at a stage where the setting information of the character as a basis of the agent has been accumulated. For example, in a case where information related to the phrases in the original story has been accumulated, the update unit 190 may update the personality information by providing information related to the accumulated phrases to the personality information.

Furthermore, when there is a change in status information related to a status of the agent, the update unit 190 may update, triggered by the change, the personality information to new personality information corresponding to the status information after the change. The update unit 190 may acquire the status information from, for example, the agent history information storage unit 129. For example, the status information may be the status of the story involving the agent, the status of the agent itself, or the like. When there is a change in the status information, the personality information is updated, triggered by the change, to new personality information corresponding to the status after the change, enabling the agent to perform an externalized behavior according to the change in the status.

Furthermore, when there is a change in the growth information related to the growth stage of an agent, the update unit 190 may update the personality information to new personality information corresponding to the growth information after the change, in accordance with the change. In this case, the update unit 190 may preliminarily include personality information necessary for the update. For example, the update unit 190 updates the personality information to the personality information corresponding to the growth stage of the agent based on the previously provided personality information based on the growth of the agent.

Furthermore, the update unit 190 may update the personality information by providing additional information defining a new personality of the agent to the personality information. For example, the update unit 190 may update the personality information by providing additional information to the personality information in response to billing from the user. Here, a case where the initial personality information is personality information generated based on the original story will be described. When the additional cost has been paid by the user, information indicating the payment of the additional cost is sent to the update unit 190. The update unit 190 provides more detailed additional information based on setting material or the like of the original story to the personality information, thereby updating the personality information to more customized personality information. Furthermore, the personality information storage unit 181 initially stores the basic information alone. For example, when the additional cost is paid by the user as described above, the individuality information may be sent to the update unit 190, and the update unit 190 may update the personality information by storing the individuality information into the individuality information storage unit 184. In this manner, by providing additional information to the personality information, the agent can perform an externalized behavior with more individuality.

The update unit 190 may update the personality information according to event information related to an event in which the user participates. For example, when the user participates in the event, for example, event information related to the event prepared by an organizer of the event is sent to the information processing device 10 and then transmitted to the update unit 190. The event information may include information indicating the event or information related to the personality of a character involved in the event. The update unit 190 updates the personality information according to the event information that has been sent, for example, so as to allow the agent to have a personality of a character involved in the event (for example, an entertainer appearing in the event). In this manner, since the personality information is updated according to the event information, the agent can perform an externalized behavior corresponding to the character appearing in the event in which the user participates, for example.

The update information may be sent to the update unit 190 included in the information processing device 11 in accordance with the event in which the user participates. For example, when the user participates in an event related to the original character of the agent, update information related to the character is sent from a predetermined server or the like to the update unit 190 included in the information processing device 11. The update unit 190 updates the personality information stored in the personality information storage unit 181 based on the update information. Here, the update information may be information unique to an event in which the user has participated. Furthermore, in a case where the original character of the agent is a character imitating a comedian, the personality update information may be information of a latest script developed by the comedian or a difference from the update information last sent.

The first application example has been described above. Note that the function of the update unit 190 may be included in the personality information storage unit 181.

3.2. Second Application Example (Advertising Management)

Figure 14:
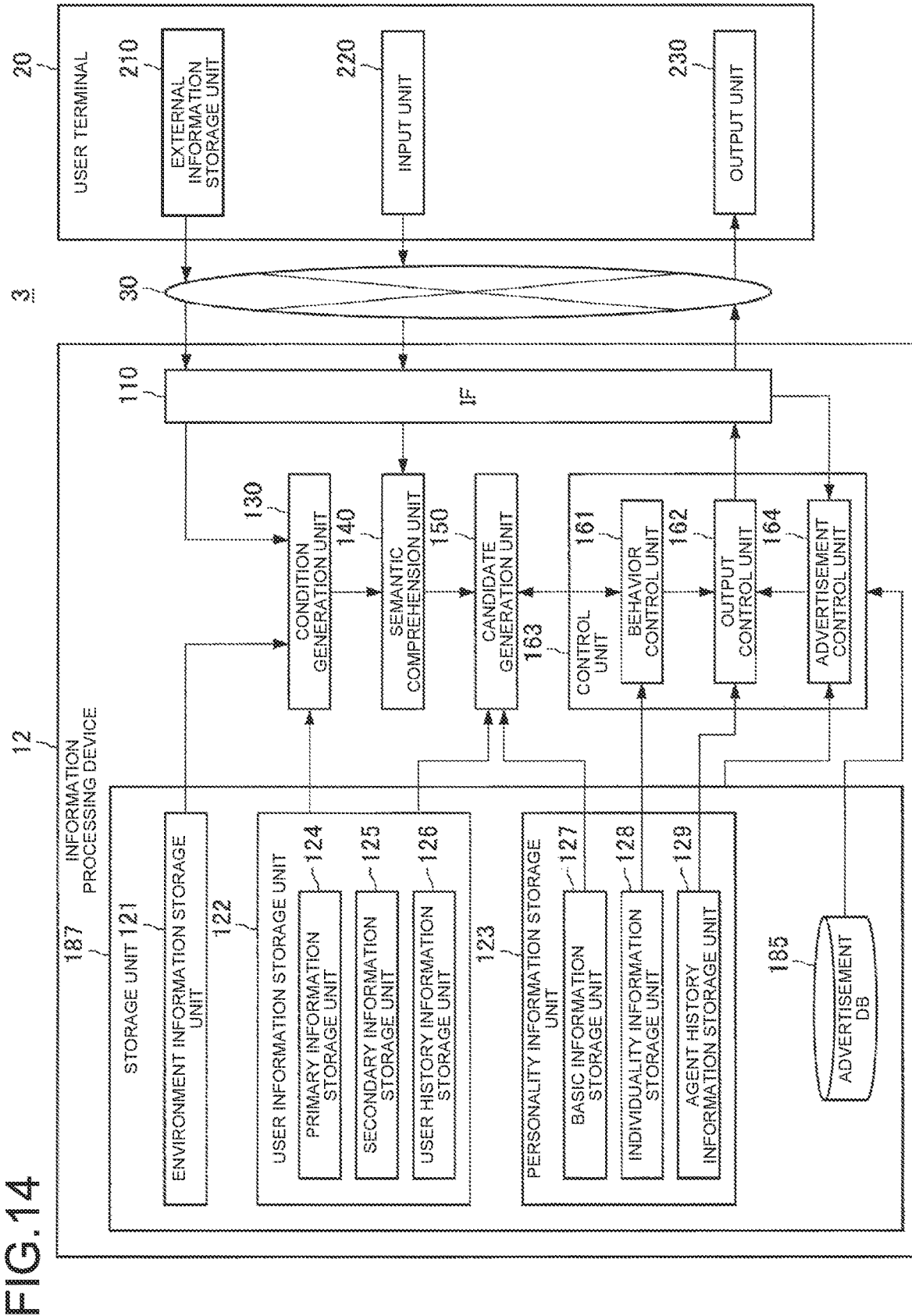
FIG. 14 is a block diagram illustrating configurations of an information processing device 12 and a user terminal 20 included in an information processing system 3 according to a second application example.

Next, a second application example will be described with reference to FIG. 14. FIG. 14 is a block diagram illustrating configurations of an information processing device 12 and the user terminal 20 included in an information processing system 3 according to the second application example. In the second application example, the information processing device 12 causes the output unit 230 of the user terminal 20 to output advertisement information related to various advertisements. More specifically, in the second application example, an advertisement control unit 164 included in the information processing device 12 determines the content of the advertisement based on the advertisement information stored in an advertisement DB 185, transmits the determined content of the advertisement to the output control unit 162, and then the output control unit 162 causes the output unit 230 to output the advertisement. With this process, an advertisement is output from the output unit 230, allowing the user to recognize the advertisement information.

An information processing device 12 according to a second application example enables an advertiser that places an advertisement to present the advertisement to a user via an agent. For example, the information processing device 12 can cause the output unit 230 to output an externalized behavior such as utterance by the agent, thereby allowing the agent to introduce a product or service. A unique comment of the agent may be further added to the introduction.

Furthermore, the information processing device 12 can also cause the output unit 230 to present a link or present an advertisement image.

At this time, the advertisement control unit 164 included in the information processing device 12 determines the content of the advertisement to be output by the output unit 230 based on the advertisement information stored in the advertisement DB 185 and the personality information. For example, the advertisement control unit 164 may analyze the metadata attached to the advertisement or the sentences appearing in the advertisement, and may control the content of the advertisement so as not to be output by the output unit 230 for the content of the advertisement deviating from the agent's scope of personality. In addition, the advertisement control unit 164 may vary the advertising frequency, the advertising time zone, or the recommendation rating of the advertisement according to the matching degree between the personality information of the agent and the content of the advertisement.

Furthermore, the advertisement control unit 164 may control the content of the advertisement such that an advertisement related to the original story related to the agent or the setting or the background of the original character is to be output to the output unit 230. That is, the advertisement control unit 164 controls the advertisement content such that the content associated with the original story or the setting or the background of the character is to be output.

For example, in a case where an agent having a highly extroverted personality is presented, the advertisement control unit 164 may control the content of the advertisement such that an event for interacting with others, such as a party or an advertisement for development own ability is to be presented. Furthermore, in a case where an agent low in conscientiousness is presented, the advertisement control unit 164 may control the content of the advertisement such that the advertisement is presented for enjoyment such as gambling or an event mainly provided for amusement. In this case, the advertisement control unit 164 may impose a certain restriction on the content of the advertisement to be output so that the content of the advertisement to be presented by the output unit 230 would not be against the law.

Furthermore, there is a case where the personality information is generated based on the phrases in the original story. In this case, when a certain noun (for example, a name of food or the like) is associated, in the personality information, with negative connotations or words such as "distaste", etc., the advertisement control unit 164 may control the content of the advertisement so as not to allow the agent corresponding to the personality information to place an advertisement related to the noun. For example, in a case where the original character of the agent utters a phrase indicating distaste for a specific food, the advertisement control unit 164 may control the content of the advertisement so as not to cause the agent to place an advertisement related to the specific food.

3.3. Third Application Example (Service According to Location/Event)

Next, a third application example will be described. The information processing device 10 according to the third application example has substantially the same configuration as the information processing device 10 illustrated in FIG. 2. In the third application example, the information processing device 10 provides a service related to a location or an event via the output unit 230.

The behavior control unit 161 controls an externalized behavior based on the personality information of the agent such that the agent performs a behavior having a linkage with a location related to the agent, the user, or the like. For example, the behavior control unit 161 controls the externalized behavior based on location information indicating a location associated with the agent, such as the agent's hometown. With this control, the agent can perform an externalized behavior having a higher matching degree with the individuality of the agent.

Furthermore, the behavior control unit 161 may control the externalized behavior of the agent so as to recommend, to the user, a behavior related to a location associated with the agent. For example, the behavior control unit 161 controls the externalized behavior so that the agent recommends visits to sacred places at locations related to the agent or a visit to related places. With this control, the user can further enjoy the externalized behavior according to the individuality of the agent.

Furthermore, the behavior control unit 161 may control the externalized behavior such that the agent recommends a location corresponding to the personality of the agent. For example, when the agent has a highly extroverted personality, the behavior control unit 161 may control the externalized behavior such that the agent recommends to the user a location or event where many people gather. Furthermore, in a case where the agent has a personality of high neuroticism, the behavior control unit 161 may control the externalized behavior so that the agent recommends a carefully examined route.

3.4. Fourth Application Example (Service According to Situation)

Figure 15:
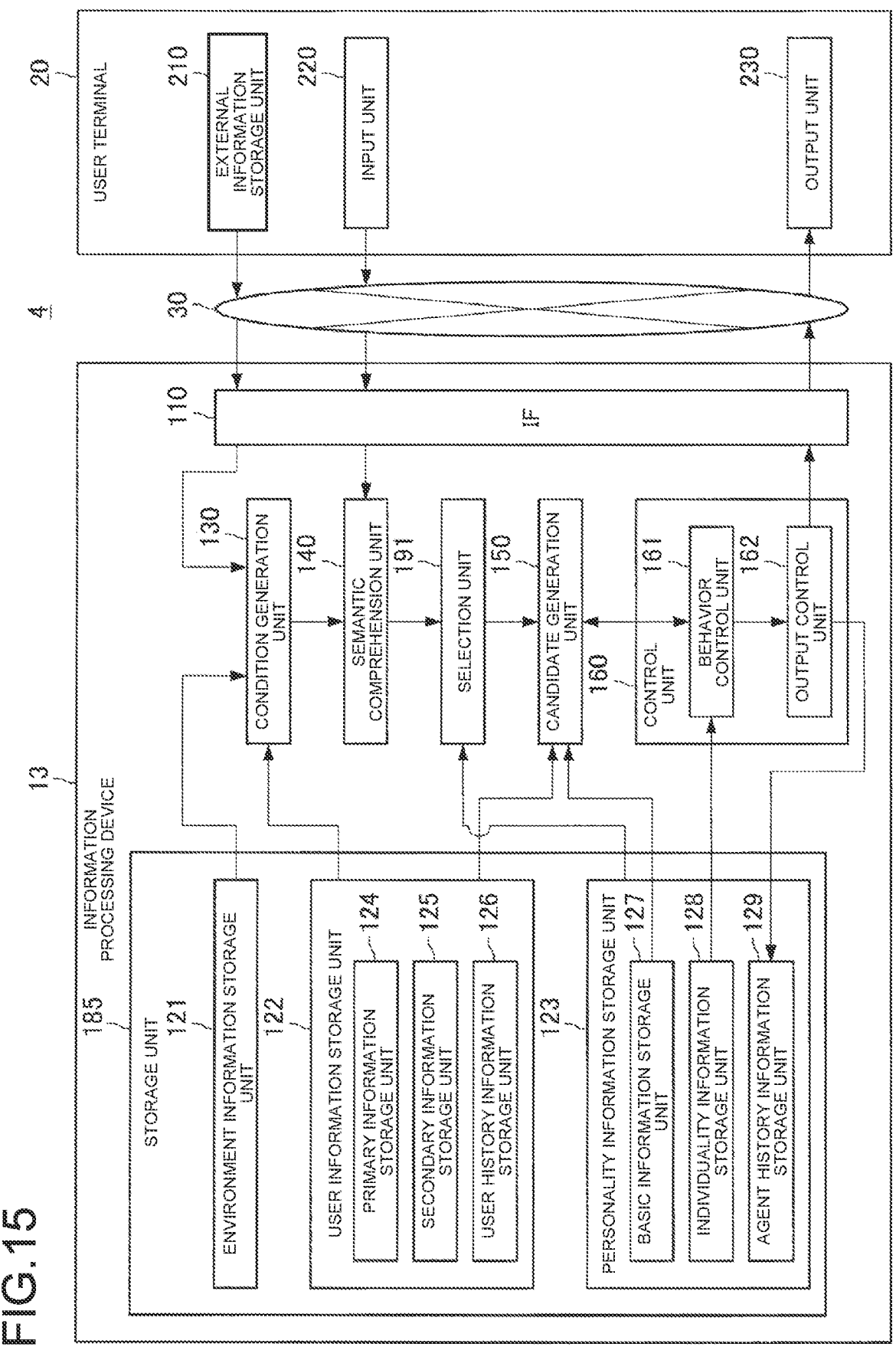
FIG. 15 is a block diagram illustrating configurations of an information processing device 13 and a user terminal 20 included in an information processing system 4 according to a fourth application example.

Next, a fourth application example will be described with reference to FIG. 15. FIG. 15 is a block diagram illustrating configurations of an information processing device 13 and the user terminal 20 included in an information processing system 4 according to the fourth application example.

In the fourth application example, the personality information storage unit 123 stores personality information related to each of a plurality of agents. That is, the personality information storage unit 123 stores basic information, individuality information, and agent history information related to each of the plurality of agents. The information processing device 13 illustrated in FIG. 15 includes a selection unit 191 in addition to the functional units included in the information processing device 10 illustrated in FIG. 2. The selection unit 191 has a function of selecting at least one or more agents from among a plurality of agents based on the personality information. In addition, the candidate generation unit 150 generates behavior candidates of the selected agent, while the behavior control unit 161 controls an externalized behavior of the selected agent. With this configuration, even in a case with a plurality of agents, it is possible to select an appropriate agent based on the personality information.

Furthermore, the selection unit 191 selects an agent to be presented from among a plurality of agents according to a situation. More specifically, the selection unit 191 may select an agent based on information related to a service provided to the user. For example, when a service of presenting news to the user is provided, the selection unit 191 selects an agent having a brilliant personality. By selecting an agent appropriate to the service in this manner, the quality of the service can be improved.

3.5. Fifth Application Example (Supervising Script)

Figure 16:
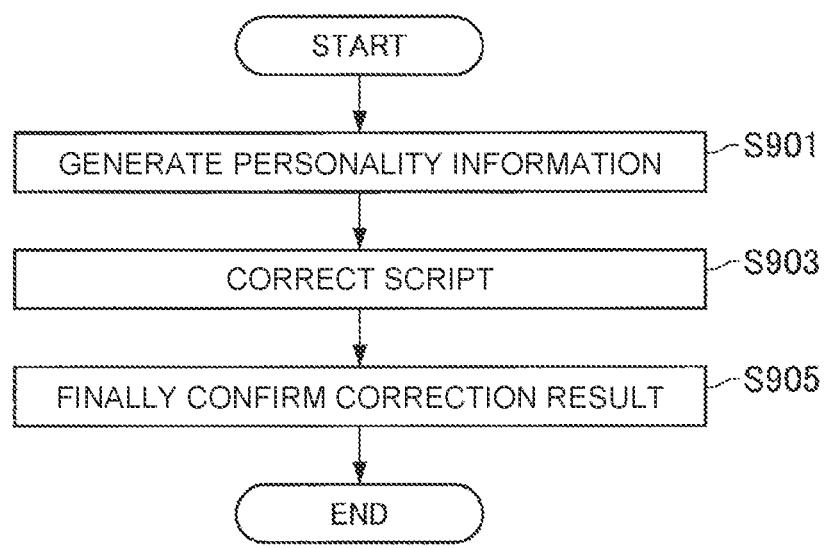
FIG. 16 is a flowchart illustrating a processing example performed by an information processing device 10 in a fifth application example.

Next, a fifth application example will be described. In the fifth application example, an externalized behavior such as an agent's utterance is not output to the output unit 230 of the user terminal 20 and is managed by a script (for example, a scenario book or the like). The fifth application example will be more specifically described with reference to FIG. 16. FIG. 16 is a flowchart illustrating a processing example performed by an information processing device 10 in a fifth application example. Hereinafter, description will be given following the flowchart of FIG. 16.

First, personality information is generated (step S901). For example, the personality information may be generated by the method for generating the personality information described with reference to FIGS. 7 to 12.

Next, a draft of the script representing the content of the externalized behavior is corrected based on the personality information (step S903). For example, a functional unit having the same function as the candidate generation unit 150 may generate behavior candidates based on the personality information, and a functional unit having the same function as the behavior control unit 161 may correct the behavior candidate based on the personality information.

Next, a final confirmation of the correction result of step S903 is performed (step S905). For example, the correction result is finally confirmed by the author of the character.

The fifth application example has been described above. According to the fifth application example, a draft is corrected based on personality information before the author confirms the draft of the script. Since the author only needs to finally confirm the corrected draft, the burden of confirming the draft is reduced.

3.6. Other Application Examples

Other application examples according to the embodiment of the present disclosure will be described. For example, when a service of presenting news to the user is provided, the behavior control unit 161 may change the content of the news read out by the agent in accordance with the personality information of the agent.

Furthermore, personality information related to the agent may be periodically sent to the information processing device 10. For example, personality information related to agents that differs day by day may be sent to the information processing device 10. With this configuration, the information processing device 10 can present to the user agents that differs day by day.

Furthermore, the information processing device 10 may provide the user terminal 20 with a proxy telephone support service by an agent. In this case, the behavior control unit 161 may control the externalized behavior of the agent such that the telephone support given by the agent differs depending on the personality information.

The information processing device 10 may present recommendation of various types of content to the user. The content may be, for example, music, a book, a movie, a television program, a cooking recipe, or the like. In this case, details of the presented content may be determined based on the tendency of the agent or the setting in the original story of the agent. For example, in a case where a cooking recipe is recommended, a mood or the like corresponding to the tendency of the agent who makes the recommendation may be reflected in the cooking recipe.

The information processing device 10 may cause the output unit 230 to allow the agent to utter a word every day based on the personality information. The behavior control unit 161 may control the externalized behavior such that the agent performs the externalized behavior related to the weather, an event, or the like of the day. For example, the behavior control unit 161 may control the externalized behavior such that the agent presents the schedule of the user. More specifically, the behavior control unit 161 may control an externalized behavior of a highly cooperative agent so as to present a schedule with a friend in a thick manner to the agent.

4. Hardware Configuration

Figure 17:
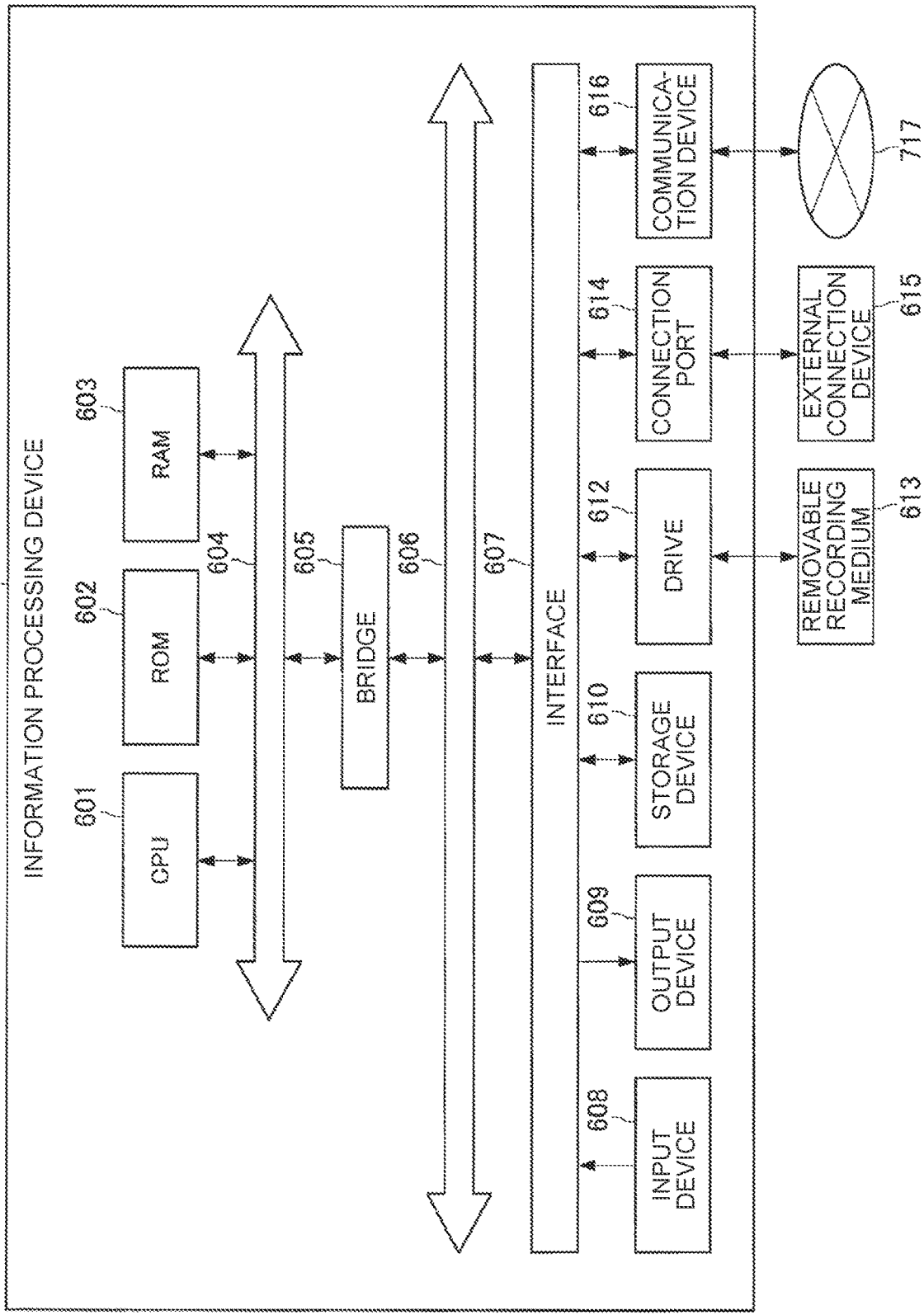
FIG. 17 is a functional block diagram illustrating an example of a hardware configuration of an information processing device 10 constituting an information processing system 1 according to an embodiment of the present disclosure.

Next, an example of a hardware configuration of the information processing device 10 constituting the information processing system 1 according to an embodiment of the present disclosure will be described in detail with reference to FIG. 17. FIG. 17 is a functional block diagram illustrating an example of the hardware configuration of the information processing device 10 constituting the information processing system 1 according to an embodiment of the present disclosure.

The information processing device 10 constituting the information processing system 1 according to the present embodiment mainly includes a CPU 601, ROM 602, and RAM 603. The information processing device 10 further includes a host bus 604, a bridge 605, an external bus 606, an interface 607, an input device 608, an output device 609, a storage device 610, a drive 612, a connection port 614, and a communication device 616.

The CPU 601 functions as an arithmetic processing device and a control device, and controls the all or part of the operation in the information processing device 10 according to various programs recorded in the ROM 602, the RAM 603, the storage device 610, or a removable recording medium 613. The ROM 602 stores programs and calculation parameters used by the CPU 601. The RAM 603 primarily stores programs used by the CPU 601, parameters that change as appropriate in execution of the programs, or the like. These are interconnected by the host bus 604 including an internal bus such as a CPU bus. For example, the candidate generation unit 150, the behavior control unit 161, and the output control unit 162 illustrated in FIG. 2 can be configured by the CPU 601.

The host bus 604 is connected to the external bus 606 such as a Peripheral Component Interconnect/Interface (PCI) bus via the bridge 605. In addition, the external bus 606 is connected with the input device 608, the output device 609, the storage device 610, the drive 612, the connection port 614, and the communication device 616, via the interface 607.

The input device 608 is an operation means operated by the user, such as a mouse, a keyboard, a touch panel, a button, a switch, a lever, and a pedal. Furthermore, the input device 608 may be, for example, a remote control means (also referred to as a remote controller) using infrared rays or other radio waves, or an external connection device 615 such as a mobile phone or a PDA that supports the operation of the information processing device 10. Furthermore, the input device 608 may include, for example, an input control circuit that generates an input signal based on the information input by the user using the above operation means and outputs the generated input signal to the CPU 601. By operating the input device 608, the user of the information processing device 10 can input various data to the information processing device 10 and instruct the processing operation.

The output device 609 is constituted with a device capable of visually or audibly notifying the user of acquired information. Examples of such devices include display devices such as CRT display devices, liquid crystal display devices, plasma display devices, EL display devices, and lamps, audio output devices such as speakers and headphones, and printer devices. The output device 609 outputs results obtained by various processes performed by the information processing device 10, for example. Specifically, the display device displays the results obtained by various types of processes performed by the information processing device 10 in text or images. Meanwhile, the audio output device converts an audio signal composed of reproduced audio data, acoustic data, or the like into an analog signal and outputs the obtained signal.

The storage device 610 is a data storage device configured as an example of the storage unit 120 of the information processing device 10. The storage device 610 includes, for example, a magnetic storage unit device such as a hard disk drive (HDD), a semiconductor storage device, an optical storage device, a magneto-optical storage device, or the like. The storage device 610 stores programs executed by the CPU 601, various data, or the like. For example, the storage unit 120 illustrated in FIG. 2 can be configured with the storage device 610.

The drive 612 is a reader/writer for a storage medium, and is built in or externally connected to the information processing device 10. The drive 612 reads information recorded on a removable recording medium 613 such as a mounted magnetic disk, optical disk, magneto-optical disk, or semiconductor memory, and outputs the read information to the RAM 603. Furthermore, the drive 612 can also write a record on the mounted removable recording medium 613 such as a magnetic disk, an optical disk, a magneto-optical disk, or semiconductor memory. Examples of the removable recording medium 613 include a DVD medium, an HD-DVD medium, and a Blu-ray (registered trademark) medium. Furthermore, the removable recording medium 613 may be a Compact Flash (CF) (registered trademark), a flash drive, a secure digital (SD) memory card, or the like. Furthermore, the removable recording medium 613 may be an integrated circuit (IC) card having an embedded non-contact IC chip, an electronic device, or the like.

The connection port 614 is a port for directly connecting to the information processing device 10. Examples of the connection port 614 include a universal serial bus (USB) port, an IEEE 1394 port, a Small Computer System Interface (SCSI) port, or the like. Other examples of the connection port 614 include an RS-232C port, an optical audio terminal, and a High-Definition Multimedia Interface (HDMI) (registered trademark) port. With the external connection device 615 connected to the connection port 614, the information processing device 10 directly acquires various data from the external connection device 615 or provides various data to the external connection device 615.

The communication device 616 is, for example, a communication interface constituted with a communication device or the like for connecting to a network 617. Examples of the communication device 616 include a wired or wireless local area network (LAN), Bluetooth (registered trademark), or a wireless USB (WUSB) communication card. Furthermore, the communication device 616 may be an optical communication router, an Asymmetric Digital Subscriber Line (ADSL) router, a modem for various communications, or the like. The communication device 616 can exchange signals or the like through the Internet and with other communication devices in accordance with a predetermined protocol such as TCP/IP. Furthermore, the communication network 617 connected to the communication device 616 includes a network or the like connected in a wired or wireless communication, and may be, for example, the Internet, a home LAN, infrared communication, radio wave communication, satellite communication, or the like.

An example of the hardware configuration capable of implementing the functions of the information processing device 10 constituting the information processing system 1 according to the embodiment of the present disclosure has been described as above. Each of the above-described components may be constituted by using a general-purpose member, or may be constituted by hardware specialized for the function of each of the components. Accordingly, it is possible to appropriately change the hardware configuration to be used according to the technical level at the time of conducting the present embodiment. Note that, although not illustrated in FIG. 17, the hardware configuration naturally includes various components corresponding to the information processing device 10 included in the information processing system 1.

Incidentally, it is possible to create a computer program for implementation of individual functions of the information processing device 10 constituting the information processing system 1 according to the present embodiment as described above and possible to install the created program on a personal computer or the like. Furthermore, it is also possible to provide a computer-readable recording medium storing such a computer program. Examples of the recording medium include a magnetic disk, an optical disk, a magneto-optical disk, a flash drive, or the like. Furthermore, the computer program described above may be distributed via a network, for example, without using a recording medium. Furthermore, the number of computers that execute the computer program is not particularly limited. For example, the computer program may be cooperatively executed by a plurality of computers (for example, a plurality of servers or the like).

5. Supplementary Notes

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

For example, the configurations of the information processing device 10 and the user terminal 20 are not limited to the examples illustrated in FIG. 2 or 13 to 15. The functional units included in the information processing device 10 and the user terminal 20 are appropriately provided in the information processing device 10 and the user terminal 20. For example, the user information storage unit 122 included in the information processing device 10 in the above embodiment may be provided in the user terminal 20.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

Note that the following configurations also belong to the technical scope of the present disclosure.

(1)

An information processing system comprising:
a user information storage unit that stores user information related to a user;
a personality information storage unit that stores personality information defining a personality unique to an agent; and
a control unit that controls an externalized behavior which is a behavior externalized by the agent, based on the personality information.

(2)

The information processing system according to (1),
wherein the personality information is not influenced by a change in the user information.

(3)

The information processing system according to (1) or (2),
wherein the personality information is information defined based on an original model related to the agent.

(4)

The information processing system according to any one of (1) to (3),
wherein the personality information includes basic information that defines the externalized behavior generally performed by the agent, and individuality information that defines individuality of the agent.

(5)

The information processing system according to (4),
wherein the control unit controls the externalized behavior of the agent by deciding whether a behavior candidate, which is a candidate of the externalized behavior generated based on the basic information, is to be determined as the externalized behavior in accordance with a matching degree between the behavior candidate and the individuality information.

(6)

The information processing system according to any one of (1) to (5), further comprising an update unit that updates the personality information to new personality information,
wherein the control unit controls the externalized behavior of the agent based on the new personality information.

(7)

The information processing system according to (6),
wherein the update unit updates information related to trends with regard to the personality information.

(8)

The information processing system according to (6) or (7),
wherein the personality information includes behavior information related to behavior that can be performed by the agent, and
the update unit updates the behavior information.

(9)

The information processing system according to (8),
wherein the personality information includes word information related to words that can be uttered by the agent, and
the update unit updates the word information.

(10)

The information processing system according to any one of (6) to (9),
wherein, when there is a change in status information related to a status of the agent, the update unit updates, triggered by the change, the personality information to the new personality information corresponding to the status information after the change.

(11)

The information processing system according to (10), wherein the status information includes growth information related to a growth stage of the agent, and where there is a change in the growth information, the update unit updates, triggered by the change, the personality information to the new personality information corresponding to the growth information after the change.

(12)

The information processing system according to any one of (6) to (11), wherein the update unit updates the personality information by providing additional information defining a new personality of the agent to the personality information.

(13)

The information processing system according to any one of (6) to (12), wherein the update unit updates the personality information in accordance with event information related to an event in which the user participates.

(14)

The information processing system according to any one of (1) to (13), wherein the personality information includes location information indicating a location related to the agent, and the control unit controls the externalized behavior based on the location information.

(15)

The information processing system according to (14), wherein the control unit controls the externalized behavior such that the agent recommends a behavior related to the location to the user.

(16)

The information processing system according to any one of (1) to (15), wherein the personality information storage unit stores personality information related to each of a plurality of the agents, the information processing system further comprises a selection unit that selects at least one or more of the agents from among the plurality of agents based on a plurality of pieces of the personality information, and the control unit controls an externalized behavior of the selected agent based on the personality information related to the selected agent.

(17)

The information processing system according to (16), wherein the selection unit selects the agent based on a relationship between the personality information related to each of a plurality of the agents and information related to a service provided to the user.

(18)

The information processing system according to any one of (1) to (17), wherein the control unit causes the user to output the controlled externalized behavior in a form of a script.

(19)

The information processing method comprising:
storing, by memory, user information related to a user,
storing, by the memory, personality information defining a personality unique to an agent; and
controlling, by a processor, an externalized behavior, which is a behavior externalized by the agent, based on the personality information.

(20)

A program causing a computer to function as an information processing device,
the information processing device comprising:
a user information storage unit that stores user information related to a user;
a personality information storage unit that stores personality information defining a personality unique to an agent; and
a control unit that controls an externalized behavior which is a behavior externalized by the agent, based on the personality information.

REFERENCE SIGNS LIST 10, 11, 12, 13 INFORMATION PROCESSING DEVICE
120 STORAGE UNIT
122 USER INFORMATION STORAGE UNIT
123 PERSONALITY INFORMATION STORAGE UNIT
127 BASIC INFORMATION STORAGE UNIT
128 INDIVIDUALITY INFORMATION STORAGE UNIT
150 CANDIDATE GENERATION UNIT
160 CONTROL UNIT
161 BEHAVIOR CONTROL UNIT
162 OUTPUT CONTROL UNIT
164 ADVERTISEMENT CONTROL UNIT
190 UPDATE UNIT
191 SELECTION UNIT
20 USER TERMINAL
220 INPUT UNIT
230 OUTPUT UNIT

The invention claimed is:

1. An information processing system, comprising:
a memory configured to:
store user information related to a user; and
store personality information that defines a personality unique to an agent, wherein
the personality information includes individuality information that defines individuality of the agent,
the personality information is based on one of a character in a real space or an animated character, and
the personality information is learned by a machine learning algorithm using learning data associated with the personality of the agent; and
a processor configured to:
determine the personality information is to be updated based on a growth stage of the personality of the agent;
acquire new learning data based on the determination that the personality information is to be updated, wherein
the new learning data includes a first set of phrases related to an adolescent stage of the agent in a case where the personality information is associated with a childhood stage of the agent, and
the new learning data includes a second set of phrases related to an adulthood stage of the agent in a case where the personality information is associated with the adolescent stage of the agent;
control the machine learning algorithm to relearn the personality information using the new learning data to update the personality information;
generate a behavior candidate based on the updated personality information and the user information, wherein the behavior candidate is a candidate of an externalized behavior of the agent, and
the behavior candidate includes an utterance candidate of a plurality of utterance candidates;
calculate a matching degree between a content of the utterance candidate and the individuality information;
select the utterance candidate from the plurality of utterance candidates that has the calculated matching degree higher than a threshold;
transmit information indicating the selected utterance candidate to a user terminal; and
control the user terminal to output the selected utterance candidate as the externalized behavior of the agent.

2. The information processing system according to claim 1, wherein the personality information is not influenced by a change in the user information.

3. The information processing system according to claim 1, wherein the personality information is information defined based on an original model related to the agent.

4. The information processing system according to claim 1, wherein the personality information further includes basic information that defines the externalized behavior performed by the agent.

5. The information processing system according to claim 1, wherein the processor is further configured to update information related to trends with regard to the personality information.

6. The information processing system according to claim 1, wherein
the personality information further includes behavior information related to the agent, and
the processor is further configured to update the behavior information.

7. The information processing system according to claim 6, wherein
the personality information further includes word information related to words uttered by the agent, and
the processor is further configured to update the word information.

8. The information processing system according to claim 1, wherein, based on a change in status information related to a status of the agent, the processor is further configured to update, triggered by the change, the personality information to first personality information corresponding to the status information after the change.

9. The information processing system according to claim 8, wherein
the status information includes growth information related to the growth stage of the agent, and
based on a change in the growth information, the processor is further configured to update, triggered by the change, the personality information corresponding to the growth information after the change.

10. The information processing system according to claim 1, wherein the processor is further configured to update the personality information by addition of additional information that defines a new personality of the agent to the personality information.

11. The information processing system according to claim 1, wherein the processor is further configured to update the personality information based on event information related to an event in which the user participates.

12. The information processing system according to claim 1, wherein
the personality information further includes location information that indicates a location related to the agent, and
the processor is further configured to control the externalized behavior based on the location information.

13. The information processing system according to claim 12, wherein the processor is further configured to control the externalized behavior such that the agent recommends a behavior related to a location of the user.

14. The information processing system according to claim 1, wherein
the memory is further configured to store a plurality of personality information for a plurality of agents,
the processor is further configured to:
select at least one agent from the plurality of agents based on the plurality of personality information; and
control the externalized behavior of the selected at least one agent based on the personality information related to the selected at least one agent, the plurality of agents includes the agent, and
the plurality of personality information includes the personality information.

15. The information processing system according to claim 14, wherein the selection of the at least one agent is based on a relationship between the plurality of personality information of the plurality of the agents and information related to a service provided to the user.

16. The information processing system according to claim 1, wherein the processor is further configured to control a user device to output the externalized behavior in a form of a script.

17. An information processing method, comprising:
storing, by a memory, user information related to a user;
storing, by the memory, personality information that defines a personality unique to an agent, wherein
the personality information includes individuality information that defines individuality of the agent,
the personality information is based on one of a character in a real space or an animated character, and
the personality information is learned by a machine learning algorithm using learning data associated with the personality of the agent;
determining, by a processor, the personality information is to be updated based on a growth stage of the personality of the agent;
acquiring, by the processor, new learning data based on the determination that the personality information is to be updated, wherein
the new learning data includes a first set of phrases related to an adolescent stage of the agent in a case where the personality information is associated with a childhood stage of the agent, and
the new learning data includes a second set of phrases related to an adulthood stage of the agent in a case where the personality information is associated with the adolescent stage of the agent;
controlling, by the processor, the machine learning algorithm to relearn the personality information using the new learning data to update the personality information;
generating, by the processor, a behavior candidate based on the updated personality information and the user information, wherein
the behavior candidate is a candidate of an externalized behavior of the agent, and
the behavior candidate includes an utterance candidate of a plurality of utterance candidates;

calculating, by the processor, a matching degree between a content of the utterance candidate and the individuality information;
selecting, by the processor, the utterance candidate from the plurality of utterance candidates that has the calculated matching degree higher than a threshold;
transmitting information indicating the selected utterance candidate to a user terminal; and
controlling, by the processor, the user terminal to output the selected utterance candidate as the externalized behavior of the agent.

18. A non-transitory computer-readable medium having stored thereon, computer-executable instructions which, when executed by an information processing system, cause the information processing system to execute operations, the operations comprising:
storing, by a memory, user information related to a user;
storing, by the memory, personality information that defines a personality unique to an agent, wherein
the personality information includes individuality information that defines individuality of the agent,
the personality information is based on one of a character in a real space or an animated character, and
the personality information is learned by a machine learning algorithm using learning data associated with the personality of the agent;
determining, by a processor, the personality information is to be updated based on a growth stage of the personality of the agent;
acquiring, by the processor, new learning data based on the determination that the personality information is to be updated, wherein
the new learning data includes a first set of phrases related to an adolescent stage of the agent in a case where the personality information is associated with a childhood stage of the agent, and
the new learning data includes a second set of phrases related to an adulthood stage of the agent in a case where the personality information is associated with the adolescent stage of the agent;
controlling, by the processor, the machine learning algorithm to relearn the personality information using the new learning data to update the personality information;
generating, by the processor, a behavior candidate based on the updated personality information and the user information, wherein
the behavior candidate is a candidate of an externalized behavior of the agent, and
the behavior candidate includes an utterance candidate of a plurality of utterance candidates;
calculating, by the processor, a matching degree between a content of the utterance candidate and the individuality information;
selecting, by the processor, the utterance candidate from the plurality of utterance candidates that has the calculated matching degree higher than a threshold;
transmitting information indicating the selected utterance candidate to a user terminal; and
controlling, by the processor, the user terminal to output the selected utterance candidate as the externalized behavior of the agent.

* * * * *